United States Patent [19]

Akita et al.

[11] Patent Number: 5,248,759

[45] Date of Patent: Sep. 28, 1993

[54] METHOD OF PRODUCING AROMATIC HETEROCYCLIC COPOLYMER AND MOLECULAR COMPOSITE MATERIAL CONTAINING SAME

[75] Inventors: Hiroshi Akita, Asaka; Tatsuya Hattori, Tokyo; Kazuhiro Kagawa, Asaka; Hiroto Kobayashi, Tokorozawa, all of Japan

[73] Assignee: Honda Giken Kogyo Kabushiki Kaisha, Tokyo, Japan

[21] Appl. No.: 882,018

[22] Filed: May 13, 1992

[30] Foreign Application Priority Data

May 13, 1991 [JP] Japan ................................. 3-137151
May 28, 1991 [JP] Japan ................................. 3-152417
Mar. 24, 1992 [JP] Japan ................................. 4-97080
Mar. 24, 1992 [JP] Japan ................................. 4-97105

[51] Int. Cl.$^5$ ............................................. C08G 15/32
[52] U.S. Cl. .................................. 528/337; 428/411.1;
428/473.5; 428/474.4; 525/420; 525/432;
525/436; 528/183; 528/340; 528/348
[58] Field of Search ............... 528/337, 183, 340, 348;
525/420, 432, 436; 428/411.1, 473.5, 474.4

[56] References Cited

U.S. PATENT DOCUMENTS 4,937,321  6/1990  Kuder ................................. 528/337

FOREIGN PATENT DOCUMENTS 63-256622 10/1988 Japan.
64-1760  1/1989 Japan.
64-1761  1/1989 Japan.
1-287167 11/1989 Japan.
2-7976   2/1990 Japan.

Primary Examiner—Harold D. Anderson
Attorney, Agent, or Firm—Birch, Stewart, Kolasch & Birch

[57] ABSTRACT

The aromatic heterocyclic copolymer is produced by (a) reacting (i) an aromatic diaminodithiol compound, hydrogen atoms of thiol groups of which compound are substituted with substituted or unsubstituted alkyl groups, with (ii) an aromatic diamino compound and (iii) a dicarboxylic acid derivative in an organic solvent, to produce a precopolymer; and (b) heating the precopolymer to cause a thiazole ring closure reaction. This aromatic heterocyclic copolymer is contained as a reinforcing polymer in a molecular composite material.

9 Claims, 5 Drawing Sheets

METHOD OF PRODUCING AROMATIC HETEROCYCLIC COPOLYMER AND MOLECULAR COMPOSITE MATERIAL CONTAINING SAME

BACKGROUND OF THE INVENTION

The present invention relates to a method of producing an aromatic heterocyclic copolymer having excellent heat resistance, mechanical properties, chemical resistance, electric properties, etc., and to a method of producing a molecular composite material comprising such an aromatic heterocyclic copolymer and a matrix polymer suitable as a structural material for aircrafts, automobiles, spacecrafts, etc.

Recently, to achieve the reduction of weight of aircrafts, automobiles, etc., plastic materials called "engineering plastics" having excellent mechanical properties, heat resistance, etc. have been increasingly used. Apart from this, development has been actively carried out to provide composite materials such as FRPs consisting of plastic materials and high-strength, high-modulus fibers such as carbon fibers, and these composite materials are being used in many applications.

It is known that the strength of these composite materials largely depend not only on the strength of plastics and reinforcing fibers but also on the interfacial bonding strength of the fibers to the matrix resins. Also, the impregnating capability of matrix resins into the fiber-reinforced preforms affect the easiness of production of composite materials and the strength of the resulting products. Accordingly, the use of high-strength, high-modulus fibers and resins would not necessarily result in composite materials having excellent strength.

Under such circumstances, to overcome the above problems, proposals have been made to develop high-strength polymer blend composites (molecular composite materials) by finely dispersing rigid polymers such as aromatic polyamides, etc. in matrix resins to a molecular level.

Aromatic polymers suitable for molecular composite materials include those containing heterocyclic repeating units such as thiazole rings, imidazole rings, oxazole rings, etc. Among them, an aromatic polythiazole having a thiazole ring is highly promising because of its excellent mechanical strength.

In the meantime, the homogeneous dispersion of a reinforcing polymer such as an aromatic polythiazole in a matrix polymer cannot be achieved if the reinforcing polymer is simply blended with the matrix polymer, because of the rigidity of the reinforcing polymer which makes it less compatible with the matrix polymer. This means that simple blending fails to provide a molecular composite material having excellent mechanical properties. Therefore, various attempts have been made so far.

For instance, Japanese Patent Laid-Open No. 1-287167 discloses a method of producing a polymer composite comprising the steps of introducing a polymer solution mainly containing (A) a reinforcing polymer consisting of polythiazole having a substantially rod-shaped skeleton and (B) a matrix polymer fusable with the reinforcing polymer into a solidification bath, and forming it into a film, the above polymer solution showing an optical anisotropy and being solidified via a phase apparently having an optical isotropy, after immersion in the solidification bath.

Japanese Patent Publication No. 2-7976 discloses a polymer composition comprising a reinforcing polymer A consisting of polythiazole having a substantially rod-shaped skeleton, and a matrix polymer B consisting of a less-crystallizable aromatic copolyamide having a glass transition temperature of 200° C. or higher and a flow-initiation temperature of 500° C. or lower, a weight ratio of A/(A+B) being 0.15-0.70. When the aromatic copolyamide is kept at a temperature between its glass transition temperature and its flow-initiation temperature for an arbitrary period of time within 5 hours, the resulting crystals have apparent sizes of 25 Å or less.

However, in the methods of producing polymer composites as disclosed in Japanese Patent Laid-Open No. 1-287167 and Japanese Patent Publication No. 2-7976, homogeneous dispersions of the reinforcing polymers in matrix polymers are not expected. This means that the resulting molecular composite materials do not show largely improved mechanical strength, etc. This appears to be due to the fact that the rigid reinforcing polymers and the matrix polymers do not show good compatibility with each other.

Thus, proposals have been made to provide a method of producing a molecular composite material of a rigid aromatic polymer without resorting to direct mixing of the rigid aromatic polymer and a matrix polymer, the method comprising the steps of homogeneously mixing a prepolymer of the rigid aromatic polymer and a matrix polymer or its prepolymer in an organic solvent, removing the organic solvent and then heating it so that the rigid aromatic polymer is formed from its prepolymer in the molecular composite material (Japanese Patent Laid-Open Nos. 64-1760 and 64-1761). By the above methods, molecular composite materials having relatively good mechanical strength, etc. can be produced.

However, the inventors have noticed that when thermal compression moldings of these molecular composite materials are produced from the aromatic polythiazole prepolymers and thermoplastic resins as matrix polymers by the methods of Japanese Patent Laid-Open Nos. 64-1760 and 64-1761, part of thiol groups in the prepolymers is subjected to a thiazole ring-closure reaction in the process of thermal forming of homogeneous mixtures of the aromatic polythiazole prepolymers and the matrix polymers, and that the resulting molecular composite materials show poor mechanical properties.

With respect to the rigid aromatic polymers, polymers having in their repeating units heterocyclic rings such as a thiazole ring, an imidazole ring, an oxazole ring, an oxazinone ring, etc. have been attracting much attention as high-strength, high-modulus, high-heat resistance polymers with high rigidity.

Among them, an aromatic polythiazole having a thiazole ring can be expected to show good properties as a plastic substitute for metal materials when used alone or in combination with other engineering plastics.

However, the rigid aromatic polymer such as the aromatic polythiazole generally has a poor solubility in organic solvents, etc. due to its high rigidity, and it is soluble only in limited kinds of strong acids such as metasulfonic acid, chlorosulfonic acid, etc. Also, it has only poor elongation and flexibility, meaning that it is poor in moldability. Accordingly, it is difficult to mold the rigid aromatic polymer without mixing with other materials.

Also, even in the case of forming a composite material of the rigid aromatic polymer and a matrix polymer, the above problem of poor moldability still remains.

Further, since the rigid aromatic polymer does not show a good compatibility with the matrix polymer, it is difficult to blend the rigid aromatic polymer with the matrix polymer at a desired proportion.

To overcome such problems, it is possible to introduce a flexible moiety into the rigid aromatic polymer, thereby improving the moldability of the rigid aromatic polymer. Also, to improve the compatibility of the rigid aromatic polymer with the other polymer, it is possible to introduce a moiety compatible with the other polymer, which has the same structure as or a similar structure to the repeating unit of the other polymer, into the rigid aromatic polymer.

One example of such an attempt is disclosed by Japanese Patent Laid-Open No. 63-256622, which is a method of producing an aromatic heterocyclic block copolymer by reacting a particular aromatic oligomer with a monomer having a benzene ring provided with at least one carboxyl group and at least one amino group in a polyphosphoric acid. The aromatic heterocyclic block copolymers obtained by this method have rigid molecular chain moieties and soft chain moieties.

However, in the above method, the synthesis of the aromatic heterocyclic block copolymer is conducted while being heated in a polyphosphoric acid. Also, when the aromatic heterocyclic block copolymer obtained by this method is combined as a reinforcing material with another polymer to provide a molecular composite material, the aromatic heterocyclic block copolymer does not show a high compatibility with the matrix polymer because it already has a rigid molecular chain moiety such as a thiazole ring. Therefore, the aromatic heterocyclic block copolymer obtained by the method of Japanese Patent Laid-Open No. 63-256622 is not suitable for use in a molecular composite material.

OBJECT AND SUMMARY OF THE INVENTION

Accordingly, an object of the present invention is to provide a method of stably producing in an organic solvent an aromatic heterocyclic copolymer which can be converted to a rigid, high-strength aromatic copolymer having an excellent mechanical strength and a high compatibility with a matrix polymer.

Another object of the present invention is to provide a method of producing a molecular composite material having an excellent mechanical strength, etc., in which a rigid aromatic polymer as a reinforcing material is well dispersed in a matrix polymer.

As a result of intense research in view of the above objects, the inventors have found that by utilizing a two-step reaction comprising reacting an aromatic diaminodithiol compound having thiol groups whose hydrogen atoms are substituted by substituted or unsubstituted alkyl groups with an aromatic diamino compound and a dicarboxylic acid derivative in an organic solvent to synthesize an aromatic precopolymer, and heating this precopolymer to cause a thiazole ring closure reaction, an aromatic heterocyclic copolymer can be stably and efficiently produced.

They also have found that by reacting an aromatic diaminodithiol compound having thiol groups whose hydrogen atoms are substituted by substituted or unsubstituted alkyl groups, and an aromatic diamino compound separately with a dicarboxylic acid derivative in an organic solvent to produce two types of oligomer, and reacting the two oligomer to form a precopolymer, which is then subjected to a ring closure reaction, an aromatic heterocyclic block copolymer can be stably and efficiently produced.

They further have found that by introducing a chain moiety having a common or similar structure to that of the matrix polymer into a precopolymer for the aromatic heterocyclic copolymer, and blending such a precopolymer with a matrix polymer and then heating it, the resulting molecular composite material contains the aromatic heterocyclic copolymer well dispersed in the matrix polymer without coagulation, whereby the molecular composite material shows excellent mechanical properties. The present invention has been completed based upon these findings.

Thus, the method of producing an aromatic heterocyclic random copolymer according to the present invention comprises the steps of:

(a) reacting (i) an aromatic diaminodithiol compound, hydrogen atoms of thiol groups of which compound are substituted with substituted or unsubstituted alkyl groups, with (ii) an aromatic diamino compound and (iii) a dicarboxylic acid derivative in an organic solvent, to produce a precopolymer represented by the general formula (1):

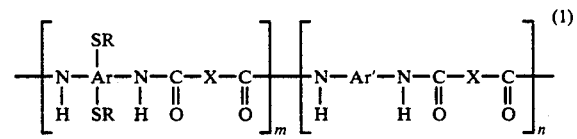

wherein Ar and Ar' are aromatic residues, R is a substituted or unsubstituted alkyl group, X is a residue of said dicarboxylic acid derivative, and m and n are integers satisfying a ratio (m/n) of 0.01/99.99–99.99/0.01; and (b) heating said precopolymer to cause a thiazole ring closure reaction, thereby producing the aromatic heterocyclic random copolymer represented by the general formula (2):

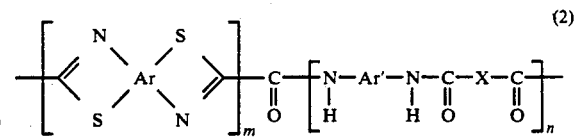

wherein Ar, Ar', X, m and n are the same as those in the formula (1).

The method of producing an aromatic heterocyclic block copolymer according to the present invention comprises the steps of:

(a) reacting (i) an aromatic diaminodithiol compound, hydrogen atoms of thiol groups of which compound are substituted with substituted or unsubstituted alkyl groups, and (ii) an aromatic diamino compound separately with (iii) a dicarboxylic acid derivative in an organic solvent to produce two types of oligomers:

(b) reacting the two oligomers in an organic solvent to produce a precopolymer represented by the general formula (3):

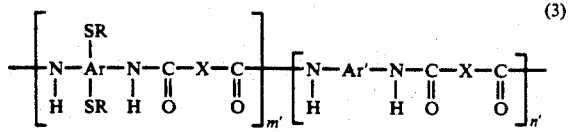

(3)

wherein Ar and Ar' are aromatic residues, R is a substituted or unsubstituted alkyl group, X is a residue of said dicarboxylic acid derivative, and m' and n' are integers satisfying a ratio (m'/n') of 0.01/99.99–99.99/0.01; and (c) heating the precopolymer to cause a thiazole ring closure reaction, thereby producing the aromatic heterocyclic block copolymer represented by the general formula (4):

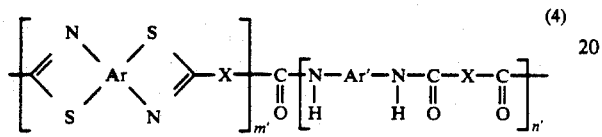

(4)

wherein Ar, Ar', X, m' and n' are the same as those in the formula (3).

The molecular composite material according to the present invention comprises an aromatic heterocyclic copolymer and a matrix polymer, the aromatic heterocyclic copolymer and the matrix polymer sharing at least partially common or similar structure units.

The method of producing a molecular composite material comprising an aromatic heterocyclic random copolymer and a matrix polymer according to the present invention comprises the steps of:

(a) preparing a homogeneous solution of (i) a precopolymer for an aromatic heterocyclic random copolymer represented by the general formula (1):

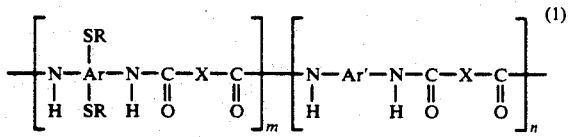

(1)

wherein Ar and Ar' are aromatic residues, R is a substituted or unsubstituted alkyl group, X is a residue of said dicarboxylic acid derivative, and m and n are integers satisfying a ratio (m/n) of 0.01/99.99–99.99/0.01, and (ii) a matrix polymer in an organic solvent; and (b) after removing the organic solvent, heating a blend of the precopolymer and the matrix polymer to cause a thiazole ring closure reaction, thereby providing the molecular composite material comprising the aromatic heterocyclic random copolymer represented by the general formula (2):

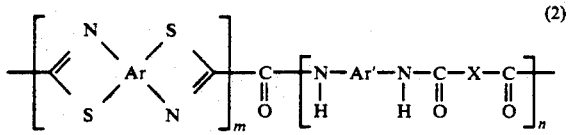

(2)

wherein Ar, Ar', X, m and n are the same as those in the formula (1), and the matrix polymer.

The method of producing a molecular composite material comprising an aromatic heterocyclic block copolymer and a matrix polymer according to the present invention comprises the steps of:

(a) preparing a homogeneous solution of a precopolymer for an aromatic heterocyclic block copolymer represented by the general formula (3):

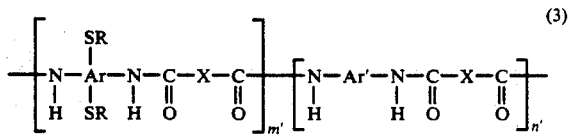

(3)

wherein Ar and Ar' are aromatic residues, R is a substituted or unsubstituted alkyl group, X is a residue of said dicarboxylic acid derivative, and m' and n' are integers satisfying a ratio (m'/n') of 0.01/99.99–99.99/0.01, and a matrix polymer in an organic solvent; and (b) after removing the organic solvent, heating a blend of the precopolymer and the matrix polymer to cause a thiazole ring closure reaction, thereby providing the molecular composite material comprising the aromatic heterocyclic block copolymer represented by the general formula (4):

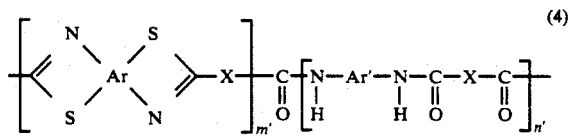

(4)

wherein Ar, Ar', X, m' and n' are the same as those in the formula (3), and the matrix polymer.

DETAILED DESCRIPTION OF THE INVENTION

Figure 1:
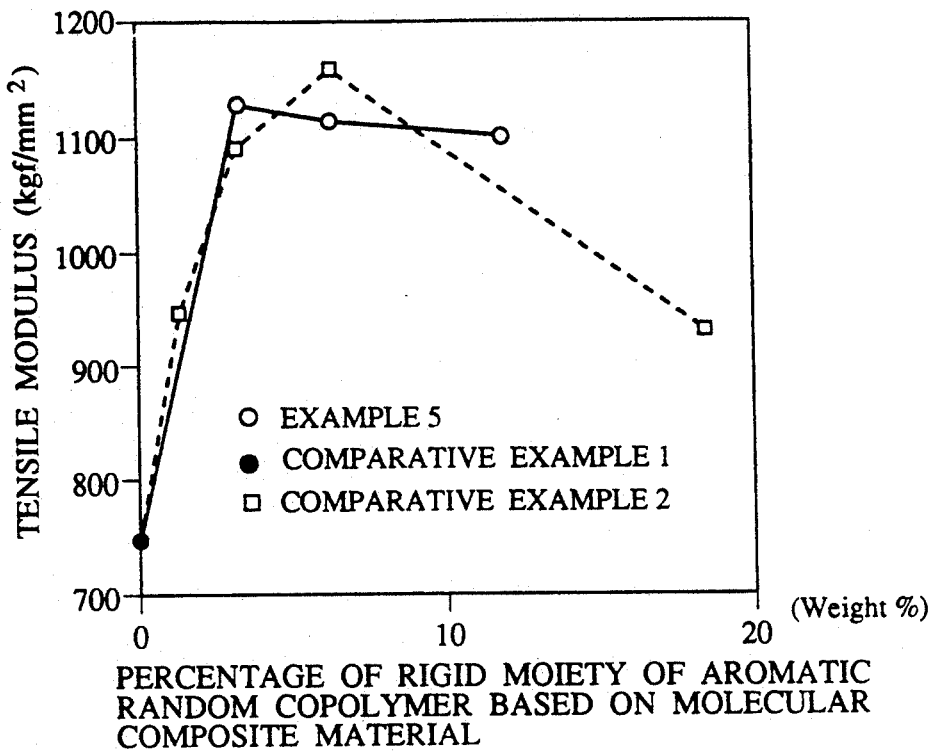
FIG. 1 is a graph showing the relation between the tensile modulus of the molecular composite material and the proportion (weight %) of a rigid moiety of the aromatic heterocyclic random copolymer based on the molecular composite material in Example 5 and Comparative Examples 1 and 2.

The present invention will be explained in detail below.

[A] Aromatic diaminodithiol compound, hydrogen atoms of thiol groups of which compound are substituted with substituted or unsubstituted alkyl groups The aromatic diaminodithiol compound, hydrogen atoms of thiol groups of which compound are substituted with substituted or unsubstituted alkyl groups (hereinafter referred to as "compound A") is represented by the general formula (5):

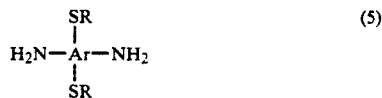

wherein Ar is an aromatic residue, and R is a substituted or unsubstituted alkyl group.

The aromatic residual group Ar may be not only a benzene ring but also any aromatic ring in which 2 or more benzene rings are condensed. Further, the aromatic residual group Ar may be those having 2 or more benzene rings bonded to each other, such as biphenyl. The amino groups and the thiol groups on both sides may be bonded to the aromatic residual group symmetrically with respect to its axis or its central point. Typical examples of such compound A are:

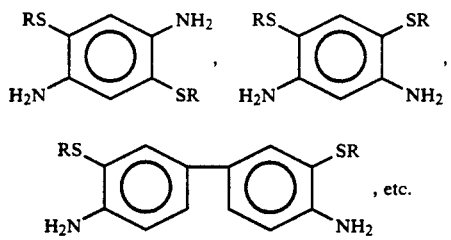

This compound A can be synthesized from an aromatic diaminodithiol compound having amino groups and thiol groups on both sides of the aromatic residue Ar. The starting aromatic diaminodithiol compound may be in the form shown in (5) above, except that each alkyl group R is replaced by a hydrogen atom. This aromatic diaminodithiol compound is used in the form of a salt such as a hydrochloride to prevent its deterioration.

The alkyl groups R bonded to the thiol groups of the aromatic diaminodithiol compound are substituted or unsubstituted alkyl groups. The unsubstituted alkyl groups include an isopropyl group, an ethyl group, an n-propyl group, an n-butyl group, a sec-butyl group, a tert-butyl group, etc. Among them, secondary or tertiary alkyl groups are particularly preferable.

The substituted alkyl groups include alkyl groups substituted with a carboxyl group, an ester group, a cyano group, a benzene group, etc. Incidentally, in the case of having such substituent groups, the alkyl groups need not be secondary ones. The substituted alkyl groups include specifically:

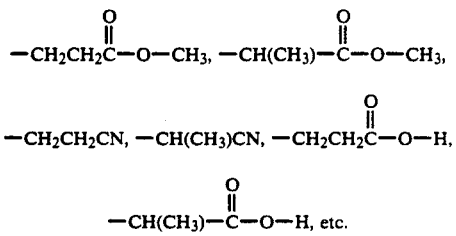

Incidentally, with respect to the first two alkyl groups among the above six substituted alkyl groups, alkyl groups bonded to an oxygen atom in the ester bond need not be a methyl group, and they may be $C_2$-$C_{10}$ alkyl groups.

Particularly when the hydrogen atoms in the thiol groups of the aromatic diaminodithiol compound are substituted with alkyl groups having a cyano group or an ester group, the precopolymer can be easily dissolved in an organic solvent such as N-methyl-2-pyrrolidone, etc. In addition, the aromatic heterocyclic precopolymer can be subjected to a ring closure reaction at a relatively low temperature.

By selecting an alkyl group having a carbon chain of a proper length (carbon number: about 2-5), the aromatic polythiazole precopolymer produced by this method can be used for the production of molecular composite materials having excellent physical and chemical properties as described below. Incidentally, the term "molecular composite material" used herein generally means a composite polymer blend in which the polythiazole (polymer or copolymer) is finely dispersed in a matrix polymer to a molecular level. This molecular composite material can be obtained by a ring closure reaction by heating a blend of the aromatic polythiazole prepolymer or precopolymer and the matrix resin.

The above alkyl group bonded to the thiol group of the aromatic diaminodithiol compound may be derived from an alkyl group-containing compound, which may be in the form of a halide, namely an alkyl halide. The halides which may be used in the present invention are bromides, chlorides, iodides, etc. of the above alkyl groups. From such halides and the above aromatic diaminodithiol compound (salts), the compounds A can be produced.

The compound A can be synthesized by the following steps: First, the aromatic diaminodithiol compound salt is reacted with the alkyl halide in an alkaline aqueous solvent. The alkaline aqueous solvent used may be water or a mixture of water and alcohol (for instance, ethanol and/or methanol) in which an alkaline salt such as sodium hydroxide is dissolved. By using an alkaline aqueous solvent, the aromatic diaminodithiol compound salt can be easily dissolved, while increasing a nucleophilic nature of the thiol groups. This accelerates the substitution reaction of hydrogen atoms in the thiol groups with the substituted or unsubstituted alkyl groups. Incidentally, the alkali concentration in the alkaline aqueous solvent is preferably 30 weight % or less.

The substitution reaction can be conducted at a temperature of 0°–100° C. When the substitution temperature is lower than 0° C., the substitution reaction rate is too low. On the other hand, when it exceeds 100° C., a secondary reaction is likely to take place. The preferred reaction temperature is 0°–95° C.

The reaction time is not specifically restricted, but it is generally about 2–24 hours.

Incidentally, to accelerate the substitution reaction, the solution is preferably stirred. Also, by using an excess amount of an alkyl halide, the reaction rate can be increased.

Further, by adding cetyl trimethyl ammonium chloride, n-butyl triphenyl phosphonium bromide, tetraphenyl phosphonium bromide, 18-crown-6, etc. as a phase transfer catalyst, the reaction between the aromatic diaminodithiol compound salt and the alkyl halide can be accelerated.

By conducting the substitution reaction under the above conditions, the hydrogen atoms in the thiol groups of the aromatic diaminodithiol compound salt can be well substituted with the alkyl groups.

In the synthesis of the compound A, the reaction of the aromatic diaminodithiol compound salt and the alkyl halide proceeds as shown by the formula (6). Here, the aromatic diaminodithiol compound salt is exemplified by 2,5-diamino-1,4-benzenethiol dichloride.

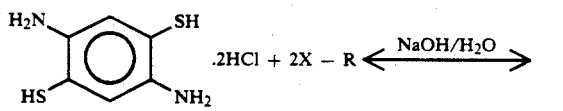

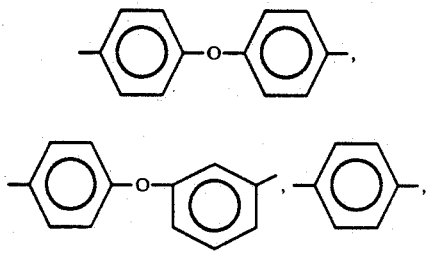

(6)

wherein X-R represents an alkyl halide.

[B] Aromatic diamino compound

The aromatic diamino compound used in the present invention is preferably an aromatic diamino compound having a flexible (bendable) structure unit. Its preferred examples include diamines having aromatic residues such as diphenyl ether, biphenyl, etc. Specific examples thereof are as follows:

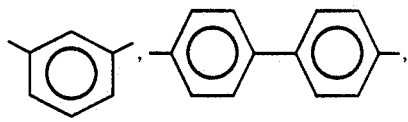

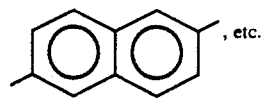

-continued

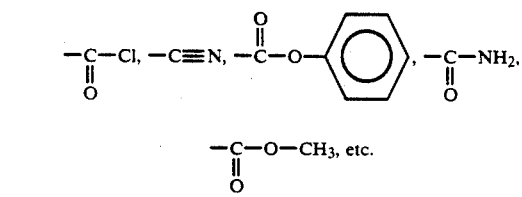

Among the above aromatic residues, the first two aromatic residues (diphenyl ether groups) are preferable. By using such diphenyl ether groups, the resulting aromatic heterocyclic copolymer (random or block copolymer) can be provided with sufficient flexibility.

In a case where the aromatic heterocyclic copolymer is used for a molecular composite material, the aromatic heterocyclic copolymer should have good compatibility with a matrix polymer. In this case, the aromatic diamino compound is selected such that it has the same structure unit as or a similar structure unit to that of the matrix polymer.

[C] Dicarboxylic acid derivatives

The dicarboxylic acid derivatives used in the present invention include those having carboxylic groups substituted with groups shown as follows:

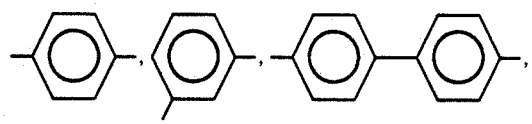

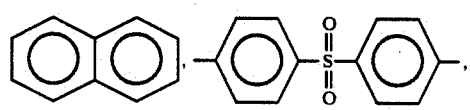

The residual groups of the above dicarboxylic acid derivatives are preferably alkylene groups having relatively short chains (carbon number: 2–10), and aromatic groups as shown below:

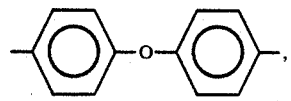

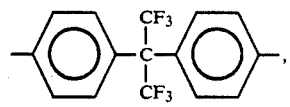

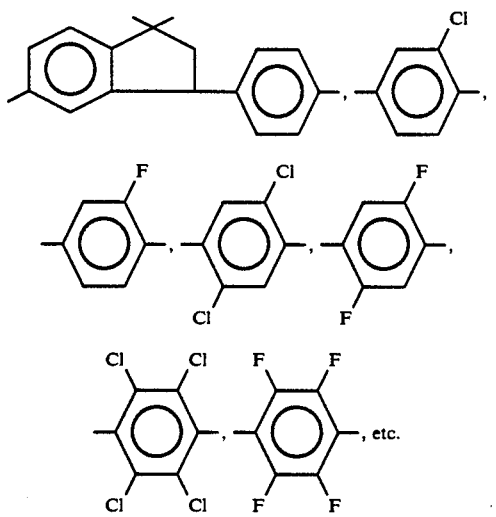

Among them, aromatic dicarboxylic acid derivatives are preferable, and preferred examples of the aromatic dicarboxylic acid derivatives are derivatives of terephthalic acid, isophthalic acid, etc. Incidentally, the dicarboxylic acid derivatives may be used alone or in combination.

[D] Production of precopolymer for aromatic heterocyclic random copolymer

The precopolymer for an aromatic heterocyclic random copolymer is represented by the general formula (1):

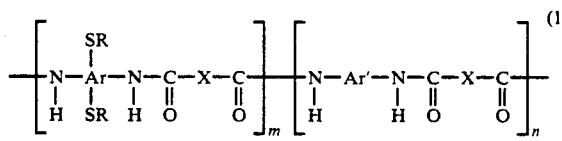

To produce the precopolymer, the compound A, the aromatic diamino compound and the dicarboxylic acid derivative are dissolved in an organic solvent at proper proportions and copolymerized. Preferably, the compound A and the aromatic diamino compound are first dissolved in an organic solvent to prepare a homogeneous solution, and the dicarboxylic acid derivative is added to the homogeneous solution.

The concentration ratio of the compound A to the aromatic diamino compound in the organic solvent corresponds to a ratio of a rigid moiety to a soft (flexible) moiety in the resulting aromatic heterocyclic random copolymer (ratio of "m" to "n" in the general formula (1)), and it may be determined depending on the applications of the aromatic heterocyclic random copolymer. In the present invention, the concentration ratio (m/n) is generally within the range of 0.01/99.99–99.99/0.01, preferably 40/60–95/5.

The molar amount of the dicarboxylic acid derivative is preferably equal to or more than the total molar amount of the compound A and the aromatic diamino compound. Also, the total concentration of the compound A, the aromatic diamino compound and the dicarboxylic acid derivative is preferably about 0.1–2 mol/liter. When the total concentration is lower than 0.1 mol/liter, reaction efficiency is too low. On the other hand, when it exceeds 2 mol/liter, each component cannot completely be dissolved.

The organic solvents which may be used in the above reaction are preferably amide solvents such as N-methyl-2-pyrrolidone, hexamethyl phosphoric triamide, N,N-dimethyl acetamide, etc., which may be used alone or in combination. To increase the reactivities of components in the organic solvent, chlorides such as LiCl, CaCl$_2$, etc. may be added to the organic solvent in an amount up to 5 weight %.

The compound A, the aromatic diamino compound and the dicarboxylic acid derivative dissolved in the organic solvent are subjected to a copolymerization reaction at a temperature between −20° C. and +50° C. When the copolymerization temperature is lower than −20° C., a sufficient copolymerization reaction does not take place. On the other hand, when it is about +100° C., the thiazole ring closure reaction may take place. Accordingly, the highest copolymerization temperature is restricted to +50° C. on the safe side. The preferred copolymerization temperature is between −20° C. and +30° C.

In the copolymerization reaction, the solution is preferably stirred to increase the copolymerization reaction rate. The copolymerization reaction time is not particularly restricted, but it is generally about 1–24 hours.

By the copolymerization reaction under the above conditions, a precopolymer for the aromatic heterocyclic random copolymer having a large polymerization degree can be obtained without causing a ring closure reaction. The resulting precopolymer has an intrinsic viscosity $\eta_{inh}$ of about 1.0–1.8 (in N-methyl-2-pyrrolidone at 30° C.).

The copolymerization reaction proceeds as shown by the formula (7) below. Here, the compound A is exemplified by 2,5-diamino-1,4-benzenethiol dichloride substituted with alkyl groups, the aromatic diamino compound is exemplified by 4,4'-diaminodiphenyl ether (4-amino-p-phenoxyaniline), and the dicarboxylic acid derivative is exemplified by terephthalic acid dichloride. Incidentally, m and n represent the polymerization degree of each unit.

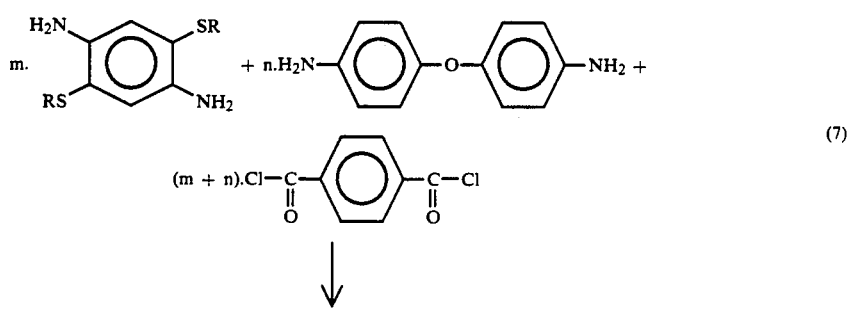

(7)

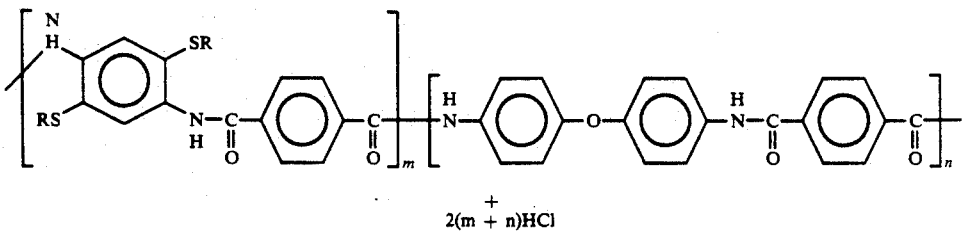

$$+ 2(m+n)HCl$$

The resulting precopolymer for an aromatic heterocyclic random copolymer is washed and dried by a known method.

[E] Production of aromatic heterocyclic random copolymer by ring closure reaction The precopolymer is heated to remove the alkyl group (R) from the precopolymer, thereby forming a thiazole ring at that site. As a result, the aimed aromatic heterocyclic random copolymer is obtained.

The ring closure reaction of the precopolymer is conducted by heating it at 250°-500° C. When the heating temperature is lower than 250° C., the thiazole ring cannot be formed. On the other hand, when heated at a temperature exceeding 600° C., the polythiazole is likely to be decomposed. In view of this fact, the upper limit of the heating temperature is restricted to 500° C. In the case of using a precopolymer obtained from an alkyl group-substituted aromatic diaminodithiol compound in which the hydrogen atoms of thiol groups are substituted with alkyl groups having a carboxylic group, a cyano group, an ester group, etc., the ring closure reaction can be conducted at such a low temperature as 250°-400° C. Incidentally, this ring closure reaction temperature is about 10°-20° C. lower than that of a polybenzothiazole prepolymer (n=0 in the formula (1)).

When the aromatic polybenzothiazole precopolymer obtained by the reaction (7) is used, the aromatic heterocyclic random copolymer having the following structure (8) can be obtained.

rately with the dicarboxylic acid derivative. For simplicity of explanation, an oligomer prepared by reacting the compound A with the dicarboxylic acid derivative is identified as "oligomer I," and an oligomer prepared by reacting the aromatic diamino compound with the dicarboxylic acid derivative is identified as "oligomer II."

With respect to the production of the oligomer I, the compound A and the dicarboxylic acid derivative are dissolved in an organic solvent and heated at a temperature between −20° C. and +200° C. while stirring. When the heating temperature is lower than −20° C., sufficient polymerization reaction does not take place. On the other hand, when the heating temperature becomes about 250° C., a thiazole ring closure reaction is likely to take place. Accordingly, the upper limit of the polymerization temperature is set at 200° C. The preferred polymerization temperature is between −10° C. and +50° C.

In the synthesis of the oligomer I, the compound A and the dicarboxylic acid derivative are essentially in equal molar amounts. However, a molar ratio of the compound A to the dicarboxylic acid derivative can be adjusted properly for the reasons below:

(i) To achieve a good reaction between the oligomer I and the oligomer II, it is preferable that one of the oligomer I and the oligomer II has an end group of —COCl, while the other oligomer has an end group of —NH$_2$.

(ii) The oligomer I should have a proper molecular

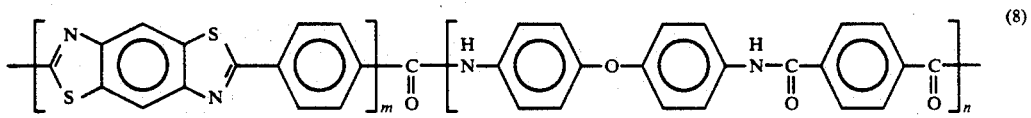

(8)

In the above formula (8), m and n represent the total numbers of the rigid moiety and the soft (flexible) moiety, respectively. In this aromatic heterocyclic random copolymer, the rigid moiety and the soft (flexible) moiety are arranged randomly.

Since a solution of the precopolymer shows a large degree of a liquid crystal property, the spinning of the precopolymer from its solution in an organic solvent is easily carried out. Accordingly, aromatic heterocyclic random copolymer fibers can be easily produced by using the method of the present invention. To increase the liquid crystal property of the precopolymer solution, the alkyl groups bonded to the thiol groups should be longer. However, taking into consideration the solubility of the precopolymer in an organic solvent, an alkyl group having a proper length should be selected.

[F] Production of precopolymer for aromatic heterocyclic block copolymer (1) Synthesis of oligomer for precopolymer Two types of oligomers are prepared by reacting the compound A and the aromatic diamino compound separately with the dicarboxylic acid derivative. For simweight.

The total concentration of the compound A and the dicarboxylic acid derivative is preferably about 0.5–5 mol/liter. When the total concentration is lower than 0.5 mol/liter, reaction efficiency is too low. On the other hand, when it exceeds 5 mol/liter, each component cannot completely be dissolved in an organic solvent.

The organic solvents used in the synthesis of the oligomer I may be the same as described in [D] above.

In the synthesis of the oligomer I, the solution is preferably stirred to increase the reaction rate. The reaction time is not particularly restricted, but it is generally about 1–120 minutes.

The polymerization reaction between the compound A and the dicarboxylic acid derivative proceeds as shown by the formula (9) below. Here, the compound A is exemplified by 2,5-diamino-1,4-benzenethiol dichloride substituted with alkyl groups, and the dicarboxylic acid derivative is exemplified by terephthalic acid dichloride. Incidentally, m' represents the polymerization degree of the oligomer I.

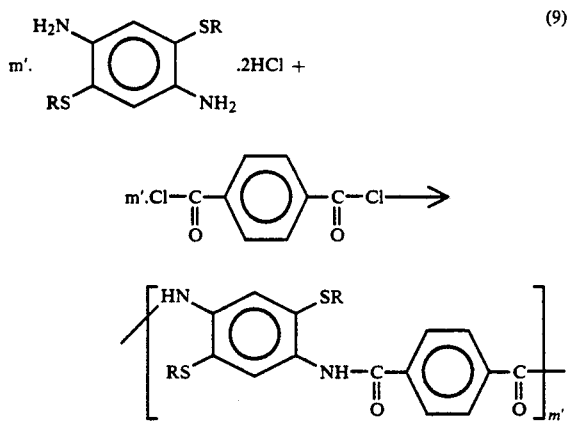

(9)

The resulting oligomer I has an intrinsic viscosity $\eta_{inh}$ of about 0.1–1.0 (in N-methyl-2-pyrrolidone at 30° C.).

The oligomer II can be produced from the aromatic diamino compound and the dicarboxylic acid derivative in the same manner as in the case of the oligomer I. In the synthesis of the oligomer II, too, the aromatic diamino compound and the dicarboxylic acid derivative are essentially in equal molar amounts, but a molar ratio of the aromatic diamino compound to the dicarboxylic acid derivative can be adjusted properly for the same reasons as described above.

The total concentration of the aromatic diamino compound and the dicarboxylic acid derivative is preferably about 0.5–5 mol/liter. When the total concentration is lower than 0.5 mol/liter, reaction efficiency is too low. On the other hand, when it exceeds 5 mol/liter, each component cannot completely be dissolved in an organic solvent.

The polymerization temperature for the oligomer II is between −20° C. and +300° C. When the polymerization temperature is lower than −20° C., sufficient polymerization reaction does not take place. On the other hand, when the polymerization temperature becomes about 400° C., the thermal decomposition of each component is likely to take place. Accordingly, the upper limit of the polymerization temperature is set at 300° C. to prevent such thermal decomposition. The preferred polymerization temperature is between −10° C. and +50° C.

The organic solvents used in the synthesis of the oligomer II may be the same as described in [D] above.

In the synthesis of the oligomer II, the reaction time is not particularly restricted, but it is generally about 1–120 minutes.

The polymerization reaction between the aromatic diamino compound and the dicarboxylic acid derivative proceeds as shown by the formula (10) below. Here, the aromatic diamino compound is exemplified by 4,4′-diaminodiphenyl ether (4-amino-p-phenoxyaniline), and the dicarboxylic acid derivative is exemplified by terephthalic acid dichloride. Incidentally, n′ represents the polymerization degree of the oligomer II.

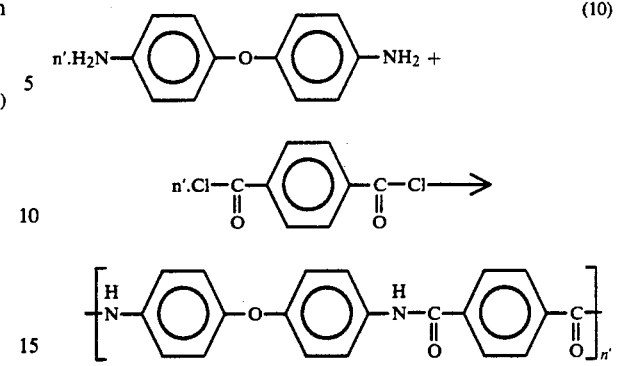

(10)

The resulting oligomer II has an intrinsic viscosity $\eta_{inh}$ of about 0.1–1.0 (in N-methyl-2-pyrrolidone at 30° C.).

As described above, the amount of the dicarboxylic acid derivative is adjusted to control the molar ratio of the compound A to the dicarboxylic acid derivative and the molar ratio of the aromatic diamino compound to the dicarboxylic acid derivative.

According to extensive research, the inventors have made the following discovery: When a relatively large amount of the oligomer I is used in the production of the precopolymer for the aromatic heterocyclic block copolymer, namely when a relatively large proportion of a rigid moiety having a thiazole ring is introduced into the aromatic heterocyclic block copolymer, the molar amount of the dicarboxylic acid derivative should be larger than that of the compound A to some extent in the process of synthesizing the oligomer I. On the other hand, when a smaller amount of the oligomer I is used than the oligomer II in the production of the precopolymer for the aromatic heterocyclic block copolymer, the molar amount of the dicarboxylic acid derivative should be slightly smaller than that of the compound A in the process of synthesizing the oligomer I. In this case, it should be noted that when the amount of the dicarboxylic acid derivative is reduced in the production of one oligomer, the amount of the dicarboxylic acid derivative should be increased correspondingly in the production of the other oligomer.

In a specific case where the compound A represented by the following formula (11):

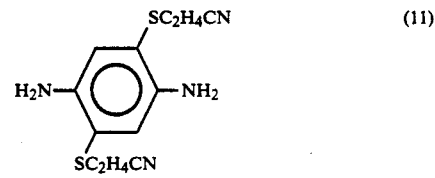

(11)

and the aromatic diamino compound represented by the following formula (12):

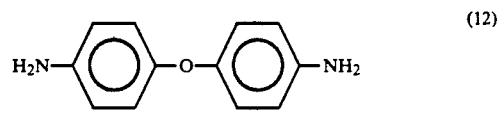

(12)

are used to synthesize the oligomer I and II, thereby producing the precopolymer, the amount of the dicarboxylic acid derivative used in the production of the oligomer I is preferably adjusted as shown in Table 1 below, depending on a molar ratio of the oligomer I to the oligomer II. Here, the molar amount of the compound A (formula (11)) is indicated by "a," and the molar amount of the aromatic diamino compound (formula (12)) is indicated by "b."

precopolymer has an intrinsic viscosity $\eta_{inh}$ of about 0.5-2.0 (in N-methyl-2-pyrrolidone at 30° C.).

The polymerization reaction of the oligomer I and the oligomer II proceeds as shown by the formula (13) below. Here, the oligomer I is exemplified by that obtained by the formula (9), and the oligomer II is exemplified by that obtained by the formula (10). Incidentally, m' and n' represent the polymerization degree of each unit.

TABLE 1

| Molar Ratio of Oligomer I to Oligomer II | Amount of Dicarboxylic Acid Derivative* |
| --- | --- |
| 8:2 | a + 0.1 b |
| 6:4 | a + 0.1 (a + b) |
| 3:7 | a − 0.16 b |
| 2:8 | a − 0.1 (a + b) |

Note
*The amount of the dicarboxylic acid derivative used in the production of the oligomer I.

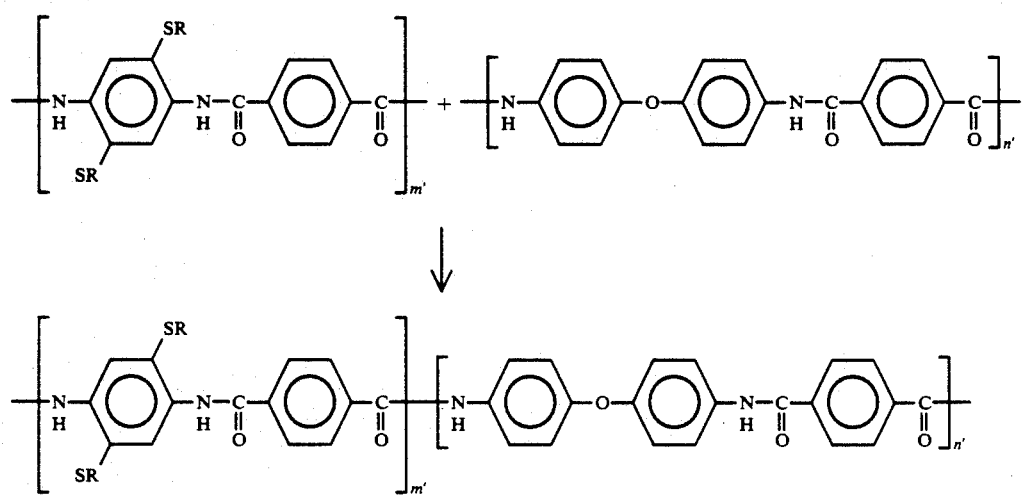

(13)

(2) Production of precopolymer

The oligomer I and the oligomer II prepared by the above method are reacted in an organic solvent to synthesize the precopolymer. The organic solvents used in this reaction may be the same as described in [D] above.

Specifically, a solution of the oligomer I in an organic solvent and a solution of the oligomer II in an organic solvent are mixed to synthesize the precopolymer at a temperature between −20° C. and +200° C. while stirring. When the reaction temperature is lower than −20° C., sufficient polymerization reaction does not take place. On the other hand, when the reaction temperature becomes about 250° C., a thiazole ring closure reaction is likely to take place. Accordingly, the upper limit of the reaction temperature is set at 200° C. The preferred reaction temperature is between −10° C. and +50° C.

By the polymerization reaction of the oligomer I and the oligomer II under the above conditions, a precopolymer for an aromatic heterocyclic block copolymer having a large polymerization degree can be obtained without causing a ring closure reaction. The resulting The resulting precopolymer for an aromatic heterocyclic block copolymer is washed and dried by a known method.

[G] Production of aromatic heterocyclic block copolymer by ring closure reaction The ring closure reaction of the precopolymer for an aromatic heterocyclic block copolymer is conducted at 250°-500° C. When the ring closure reaction temperature is lower than 250° C., the thiazole ring cannot be formed. On the other hand, when heated at a temperature exceeding 600° C., the polythiazole is likely to be decomposed. In view of this fact, the upper limit of the ring closure reaction temperature is restricted to 500° C. on the safe side. In the case of using a precopolymer obtained from an alkyl group-substituted aromatic diaminodithiol compound in which the hydrogen atoms of thiol groups are substituted with alkyl groups having a carboxylic group, a cyano group, an ester group, etc., the ring closure reaction can be conducted at such a low temperature as 250°-400° C. Incidentally, this ring closure reaction temperature is about 10°-20° C. lower than that of a polybenzothiazole prepolymer (n=0 in the formula (13)).

By heating the precopolymer, the alkyl group (R) are removed from the precopolymer, thereby forming a thiazole ring at that site. As a result, the aimed aromatic heterocyclic block copolymer is obtained.

When the precopolymer obtained by the reaction (13) is used, the aromatic heterocyclic block copolymer having the following structure (14) can be obtained.

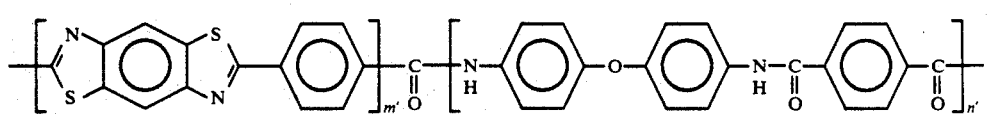

(14)

In the above formula (14), m' and n' represent the total numbers of the rigid moiety and the soft (flexible) moiety, respectively. In this aromatic heterocyclic block copolymer, the rigid moiety and the soft (flexible) moiety are arranged as blocks having certain lengths.

Since a solution of the precopolymer shows a large degree of a liquid crystal property, the spinning of the precopolymer from its solution in an organic solvent is easily carried out. Accordingly, aromatic heterocyclic block copolymer fibers can be easily produced by using the method of the present invention. To increase the liquid crystal property of the precopolymer solution, the alkyl group bonded to the thiol groups should be longer. However, taking into consideration the solubility of the precopolymer in an organic solvent, an alkyl group having a proper length should be selected.

[H] Matrix polymers

The matrix polymers usable in the present invention include polyamides, polyimides, polyamideimides, etc. Since these resins have excellent compatibility with the precopolymer of the aromatic heterocyclic (random or block) copolymer, they can provide molecular composite materials with excellent mechanical strength. Preferred matrix polymers are aromatic polyamides.

[I] Production of molecular composite material containing aromatic heterocyclic random copolymer In the production of the molecular composite material comprising the aromatic heterocyclic random copolymer, the precopolymer and the matrix polymer are dissolved in an organic solvent which is compatible with both components. Such organic solvents may be the same as described in [D] above.

With respect to the proportion of the precopolymer to the matrix polymer, reinforcing effect can be obtained even in an extremely small proportion, but it is preferably determined such that the weight ratio of the aromatic heterocyclic random copolymer to the matrix polymer in the molecular composite material is in the range of 1:100–1:1. When the amount of the aromatic heterocyclic random copolymer serving as a reinforcing polymer is too large, it is so dense in the resulting molecular composite material that the aromatic heterocyclic random copolymer undesirably tends to gather together to form clusters, making the dispersion of the aromatic polythiazole poor at a molecular level. Accordingly, the resulting molecular composite material has a poor mechanical strength. The preferred proportion of the precopolymer to the matrix polymer is 1:50–1:3.

The precopolymer and the matrix polymer may be dissolved in an organic solvent by any method as long as a homogeneous solution is produced. For instance, each of the precopolymer solution and the matrix polymer solution may be prepared separately, and then mixed to provide a homogeneous solution, or the matrix polymer may be added to a solution of the precopolymer. Also, both components may be added at once to the same organic solvent. The concentration of the final solution is determined such that the total amount of the precopolymer and the matrix polymer is 1–20 weight %.

With respect to the mixing time, it may depend upon the types of the matrix polymers and the solvents used, but it is preferably 6 hours to 30 days. With respect to the mixing temperature, it is preferably between −15° C. and 150° C.

The preparation of the homogeneous solution of the precopolymer and the matrix polymer is preferably conducted in an atmosphere of an inert gas such as a nitrogen gas, an argon gas, etc. or in vacuum.

After the preparation of the homogeneous solution, the organic solvent is evaporated. This evaporation step is preferably carried out after a film or a yarn is formed by a casting method. Since a solution of the precopolymer substituted with alkyl groups shows a large liquid crystal property as described above, it is easy to form yarns from a solution of the precopolymer and the matrix polymer in an organic solvent.

The molecular composite material of the precopolymer and the matrix polymer may be dried by a known method.

Next, the above molecular composite material of the precopolymer and the matrix polymer is heated, so that a thiazole ring closure reaction takes place in the precopolymer to obtain a molecular composite material. A heating temperature for the ring closure reaction may be 250°–500° C., preferably 250°–400° C.

The heating of the mixture of the precopolymer and the matrix polymer can be conducted at a constant temperature, and it may also be conducted according to a heating program in which a heating temperature is elevated stepwise. One example of such a heating program comprises keeping at 120° C. for 30 minutes, heating from 120° C. to 350° C. over 30 minutes, and then keeping at 350° C. for 30 minutes.

The precopolymer homogeneously dispersed in the matrix polymer at a molecular level is converted to an aromatic heterocyclic random copolymer by heating. When the precopolymer prepared by the formula (7) is used, the aromatic heterocyclic random copolymer contained in the molecular composite material has the following structure (15):

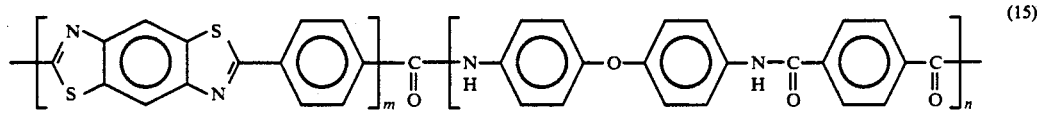

By the above method, excellent dispersion of the aromatic heterocyclic random copolymer in the matrix polymer to a molecular level can be achieved, resulting in the molecular composite material having excellent mechanical properties.

[J] Production of molecular composite material containing aromatic heterocyclic block copolymer The production of the molecular composite material comprising the aromatic heterocyclic block copolymer and the matrix polymer can be conducted under the same conditions as in the case of the molecular composite material containing the aromatic heterocyclic random copolymer, with some exceptions as described below.

With respect to the proportion of the precopolymer to the matrix polymer, it is preferably determined such that the weight ratio of the aromatic heterocyclic block copolymer to the matrix polymer in the molecular composite material is in the range of 1:100–5:1. The more preferred proportion of the precopolymer to the matrix polymer is 1:50-3.5:1.

The precopolymer homogeneously dispersed in the matrix polymer at a molecular level is converted to an aromatic heterocyclic block copolymer by heating. When the precopolymer represented by the formula (13) is used, the aromatic heterocyclic block copolymer contained in the molecular composite material has the structure as shown by the formula (14).

By the above method, excellent dispersion of the aromatic heterocyclic block copolymer in the matrix polymer to a molecular level can be achieved, resulting in the molecular composite material having excellent mechanical properties.

The present invention will be described in further detail by way of the following Examples.

EXAMPLE 1

(1) Synthesis of precopolymer for aromatic heterocyclic random copolymer 7 mmol (1.9488 g) of a compound A represented by the formula (11):

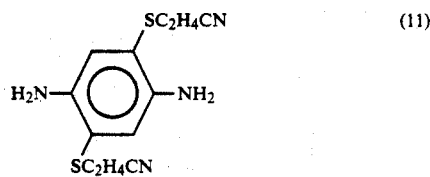

and 3 mmol (0.6006 g) of an aromatic diamino compound represented by the formula (12):

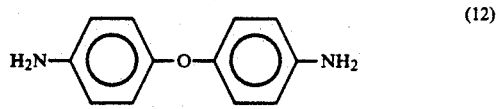

were dissolved in 15 ml of N-methyl-2-pyrrolidone (NMP) in an argon atmosphere to prepare a homogeneous solution.

This solution was cooled in an ice water bath, and 10 mmol (2.3746 g) of 2-chloroterephthalic acid chloride was added. The solution was gradually heated to a room temperature while stirring, and kept at a room temperature for 6 hours.

The resulting emerald green solution was poured into a large amount of methanol while stirring. After stirring for 30 minutes, filtration was conducted, and the solvent was removed by refluxing with a water/methanol solution overnight. The resulting polymer was dried at 100° C. for 24 hours in vacuum. Its yield was 99.8%.

This polymer had an intrinsic viscosity $\eta_{inh}$ of 1.38 (dl/g). Incidentally, the measurement of an intrinsic viscosity was conducted in NMP at a polymer concentration of 0.5 g/dl at 30° C. by an Ubbelode's viscometer.

It was presumed that this polymer (precopolymer) had the following formula (16):

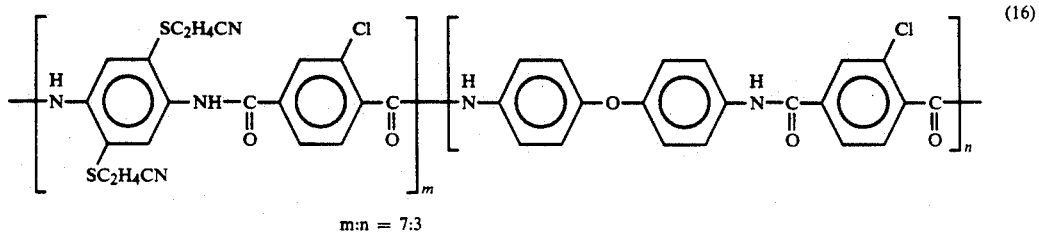

A solution of this precopolymer in NMP was cast onto a glass plate to form a transparent isotropic film having a thickness of 30 μm. By measurement according to JIS K7127, it was confirmed that the film had a tensile modulus of 526.0 kgf/mm², and a tensile strength of 10.5 kgf/mm².

(2) Ring closure reaction to aromatic heterocyclic random copolymer

The film obtained in the step (1) was heated at 340° C. for 30 minutes to obtain a dark brown transparent film. According to TG-DTA and IR spectrum measurement, it was confirmed that the substituted alkyl group attached to the compound A were removed, and that thiazole rings were formed. The resulting aromatic heterocyclic random copolymer had the following structure (17):

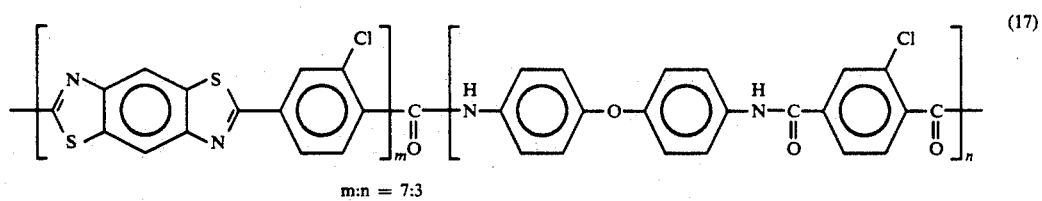

By measurement according to JIS K7127, it was confirmed that the film of the above aromatic heterocyclic random copolymer had a tensile modulus of 701.0 kgf/mm², and a tensile strength of 15.6 kgf/mm².

EXAMPLE 2

(1) Synthesis of precopolymer for aromatic heterocyclic random copolymer 1 mmol (0.2784 g) of the same compound A as in Example 1, and 9 mmol (1.8018 g) of the same aromatic diamino compound as in Example 1 were dissolved in 15 ml of NMP in an argon atmosphere to prepare a homogeneous solution.

This solution was cooled in an ice water bath, and 10 mmol (2.0302 g) of isophthalic acid chloride was added as a dicarboxylic acid derivative. The solution was gradually heated to a room temperature while stirring, and kept at a room temperature for 6 hours.

The resulting reaction product solution was poured into a large amount of methanol while stirring. After stirring for 30 minutes, filtration was conducted, and the solvent was removed by refluxing with a water/methanol solution overnight. The resulting polymer was dried at 100° C. for 24 hours in vacuum. Its yield was 99.8%.

This polymer had an intrinsic viscosity $\eta_{inh}$ of 1.20 (dl/g) when measured in the same manner as in Example 1.

It was presumed that this precopolymer had the following formula (18):

compound, (ii) changing the molar ratio (m/n) to 5:5, and (iii) using terephthalic acid dichloride as a dicarboxylic acid derivative.

A solution of the resulting precopolymer in the LiCl/NMP solution containing 5% by weight of lithium chloride was poured into a large amount of methanol while stirring. After filtration, the precopolymer was boiled in a methanol/water solvent to remove LiCl. By vacuum drying, white precopolymer powder was obtained. Its yield was 98%. This precopolymer had an intrinsic viscosity $\eta_{inh}$ of 1.62 (dl/g) in NMP containing 5% by weight of lithium chloride.

The precopolymer powder was dissolved in a LiCl/NMP solution containing 5% by weight of lith-

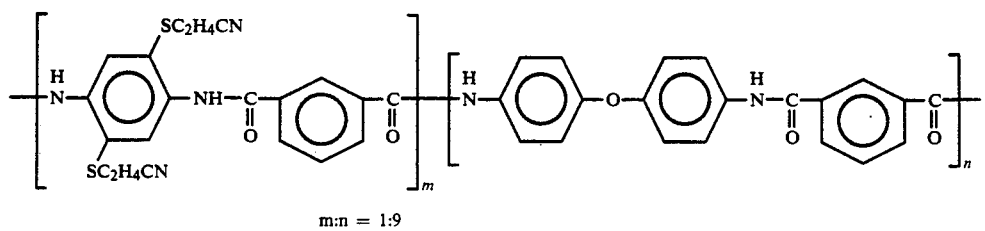

(18)

m:n = 1:9

A solution of this precopolymer in NMP was cast onto a glass plate to form a transparent isotropic film having a thickness of 30 μm. By measurement according to JIS K7127, it was confirmed that the film had a tensile modulus of 265.7 kgf/mm², and a tensile strength of 4.71 kgf/mm².

(2) Ring closure reaction to aromatic heterocyclic random copolymer

The film obtained in the step (1) was heated at 350° C.

ium chloride, and cast onto a glass plate to form a colorless transparent film.

This film was heated at 350° C. for 30 minutes in vacuum to obtain a pale brown transparent film. According to TG-DTA and IR spectrum measurement, it was confirmed that the substituted alkyl group attached to the compound A were removed, and that thiazole rings were formed. The resulting aromatic heterocyclic random copolymer had the following structure (20):

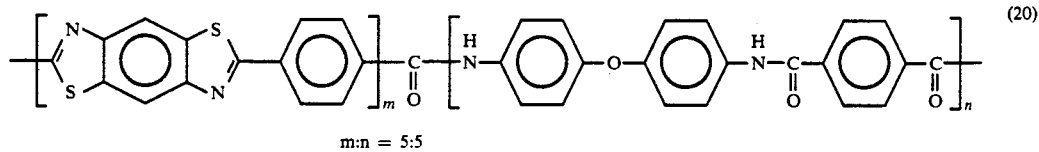

(20)

m:n = 5:5 for 30 minutes in vacuum to obtain a pale brown transparent film. According to TG-DTA and IR spectrum measurement, it was confirmed that the substituted alkyl group attached to the compound A were removed, and that thiazole rings were formed. The resulting aromatic heterocyclic random copolymer had the following structure (19):

By measurement according to JIS K7127, it was confirmed that the resulting film had a tensile modulus of 433.1 kgf/mm², and a tensile strength of 14.35 kgf/mm².

EXAMPLE 4

A precopolymer film was prepared in the same manner as in Example 1, except for setting a molar ratio of

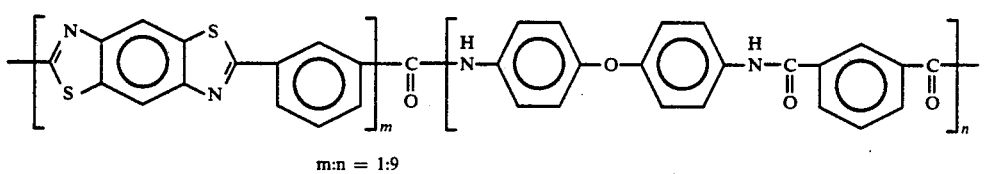

(19)

m:n = 1:9

By measurement according to JIS K7127, it was confirmed that the resulting film had a tensile modulus of 328.4 kgf/mm², and a tensile strength of 10.30 kgf/mm².

EXAMPLE 3

Polymerization reaction was conducted in the same manner as in Example 2, except for (i) using a LiCl/NMP solution containing 5% by weight of lithium chloride as a solvent for preparing a homogeneous solution of the compound A and the aromatic diamino the compound A to the aromatic diamino compound at 1:1.

By measurement according to JIS K7127, it was confirmed that this precopolymer film had a tensile modulus of 527.2 kgf/mm², and a tensile strength of 13.0 kgf/mm².

This film was heated in the same manner as in Example 1 to obtain a dark brown transparent film. According to TG-DTA and IR spectrum measurement, it was confirmed that the substituted alkyl group attached to the compound A were removed, and that thiazole rings were formed. The resulting aromatic heterocyclic random copolymer had the following structure (21):

cometer. The precopolymer had the following structure (22):

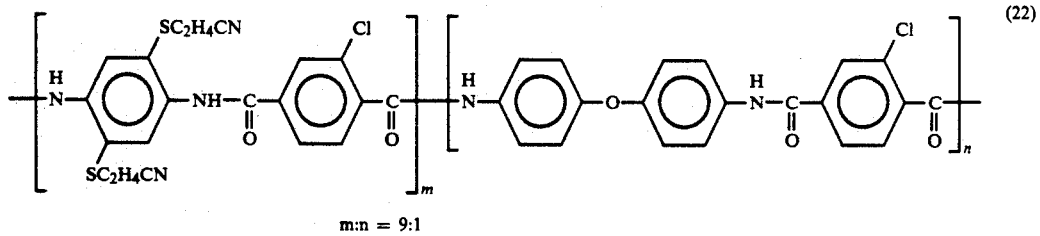

(2) Preparation of molecular composite material
The above precopolymer and an aromatic polyamide

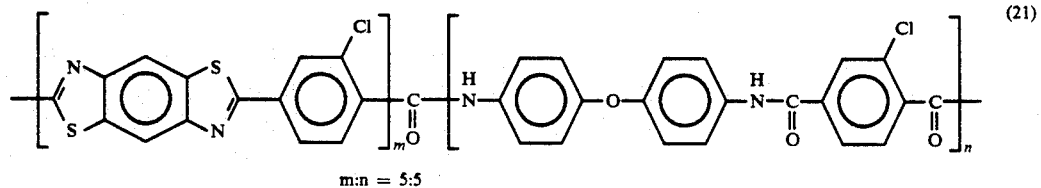

By measurement according to JIS K7127, it was confirmed that the resulting film had a tensile modulus of 558.9 kgf/mm², and a tensile strength of 15.8 kgf/mm².

EXAMPLE 5

(1) Synthesis of precopolymer
9 mmol (2.5056 g) of a compound A represented by the formula (11):

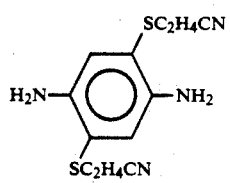

and 1 mmol (0.2002 g) of an aromatic diamino compound represented by the formula (12):

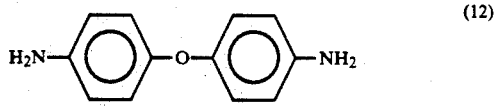

were dissolved in 15 ml of N-methyl-2-pyrrolidone (NMP) in an argon atmosphere to prepare a homogeneous solution.

This solution was cooled in an ice water bath, and 10 mmol (2.3746 g) of 2-chloroterephthalic acid chloride was added. The solution was gradually heated to a room temperature while stirring, and kept at a room temperature for 6 hours.

The resulting emerald green solution was poured into a large amount of methanol while stirring. After stirring for 30 minutes, filtration was conducted, and the solvent was removed by refluxing with a water/methanol solution overnight. The resulting precopolymer was dried at 100° C. for 24 hours in vacuum. Its yield was 99.8%.

This precopolymer had an intrinsic viscosity $\eta_{inh}$ of 1.20 (dl/g). Incidentally, the measurement of an intrinsic viscosity was conducted in NMP at a polymer concentration of 0.5 g/dl at 30° C. by an Ubbelode's vis- (TX-1, manufactured by Toray, Ltd.) were used to prepare various molecular composite materials with percentages of rigid moieties containing thiazole rings (moieties in parenthesis of "m" in the formula (22) after thiazole ring closure reaction) changing up to 12 weight % based on the total amount of the aromatic heterocyclic random copolymer and the matrix polymer, by the procedure described below.

First, predetermined amounts of the precopolymer and TX-1 (total amount of these two components was kept at 5 weight %) were dissolved in NMP. Mixing was conducted at 60° C. for one week. Next, the resulting homogeneous polymer solution in NMP was cast onto a glass plate and the solvent was removed at 80° C. under normal pressure to form a transparent isotropic film having a thickness of 30 μm.

Figure 2:
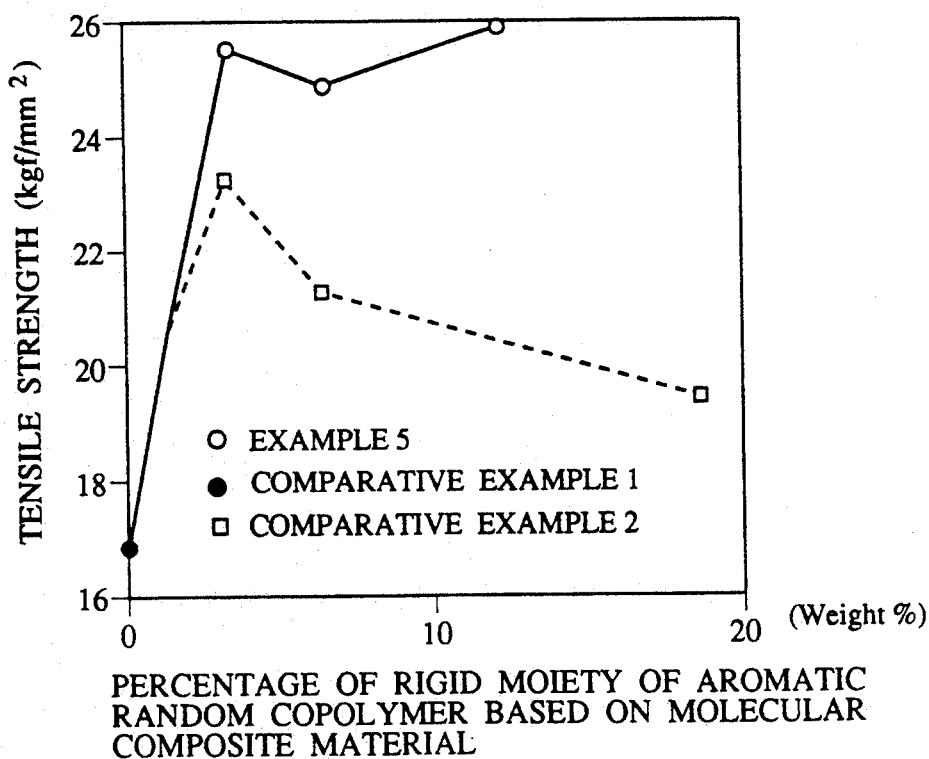
FIG. 2 is a graph showing the relation between the tensile strength of the molecular composite material and the proportion (weight %) of a rigid moiety of the aromatic heterocyclic random copolymer based on the molecular composite material in Example 5 and Comparative Examples 1 and 2.

The resulting film was heated at 340° C. for 30 minutes in vacuum. According to TG-DTA and IR spectrum measurement on the heat-treated film, it was confirmed that thiazole rings were formed. According to JIS K7127, the resulting film was measured with respect to a tensile modulus and a tensile strength. FIG. 1 shows the results of tensile modulus measurement, and FIG. 2 shows the results of tensile strength measurement. In FIGS. 1 and 2, the abscissa indicates the percentage (weight %) of rigid moieties containing thiazole rings in the aromatic heterocyclic random copolymer.

COMPARATIVE EXAMPLE 1

Only TX-1 was added to NMP without adding the precopolymer, and a film was prepared in the same manner as in Example 5. This film was measured with respect to a tensile modulus and a tensile strength. The results of tensile modulus measurement and tensile strength measurement are shown in FIGS. 1 and 2, respectively.

COMPARATIVE EXAMPLE 2

A prepolymer of polybenzothiazol (n=0 in the formula (23)) was prepared in the same manner as in Example 5 using the same compound A and dicarboxylic acid derivative as in Example 5.

A molecular composite material film was prepared in the same manner as in Example 5, (2), except for using the above polybenzothiazol prepolymer. The resulting molecular composite material was measured with respect to a tensile modulus and a tensile strength. The results of tensile modulus measurement and tensile strength measurement are shown in FIGS. 1 and 2, respectively.

As is clear from FIGS. 1 and 2, the molecular composite material of the present invention has a higher tensile strength than the molecular composite materials of Comparative Examples 1 and 2 containing reinforcing polymers (not copolymerized), and with respect to the tensile modulus, they are substantially on the same level.

EXAMPLE 6

A precopolymer was prepared in the same manner as in Example 5, except for setting a molar ratio of the compound A to the aromatic diamino compound at 8:2. This precopolymer and a matrix polymer having the structure shown by the formula (23) below were used to prepare a molecular composite material film in the same manner as in Example 5.

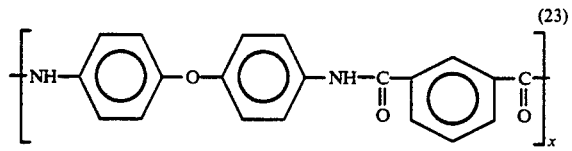

(23)

A ratio of the precopolymer to the matrix polymer was set such that the percentage of rigid moieties containing thiazole rings was 10 weight % based on the total amount of the aromatic heterocyclic random copolymer and the matrix polymer.

A plurality of films thus obtained were subjected to a heat treatment at a maximum temperature of 230°–350° C. The resulting molecular composite material films were measured with respect to a tensile modulus and a tensile strength. The results of tensile modulus measurement and tensile strength measurement are shown in FIGS. 3 and 4, respectively.

COMPARATIVE EXAMPLE 3

A molecular composite material film was prepared in the same manner as in Example 6 except for using the polybenzothiazol prepolymer synthesized in Comparative Example 2 in place of the precopolymer. This molecular composite material film was measured with respect to a tensile modulus and a tensile strength. The results of tensile modulus measurement and tensile strength measurement are shown in FIGS. 3 and 4, respectively.

Figure 3:
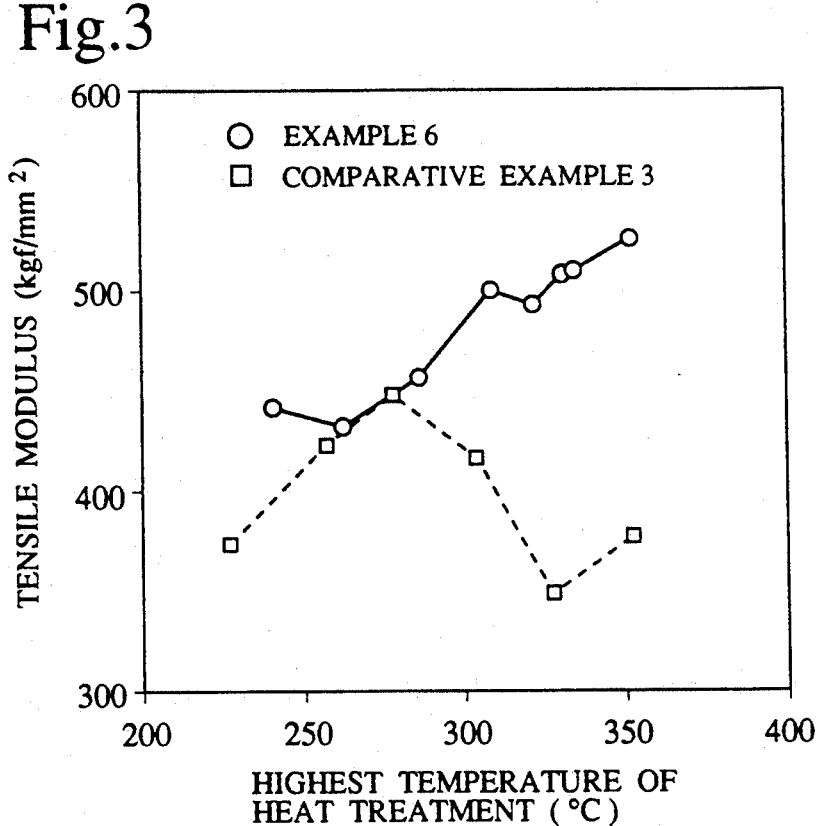
FIG. 3 is a graph showing the relation between the tensile modulus of the molecular composite material and the highest temperature of the heat treatment in Example 6 and Comparative Example 3.
Figure 4:
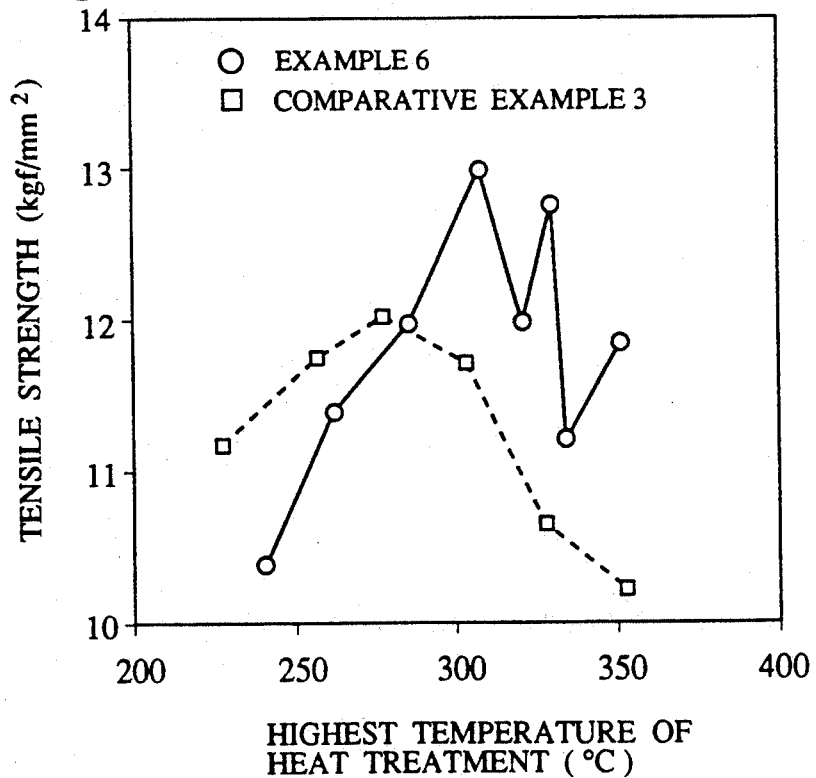
FIG. 4 is a graph showing the relation between the tensile strength of the molecular composite material and the highest temperature of the heat treatment in Example 6 and Comparative Example 3.

As is clear from FIG. 3, the molecular composite material of the present invention shows higher tensile modulus as the heat treatment temperature of the film increases from about 250° C. to 350° C. at which the thiazole ring closure reaction is completed. On the other hand, the molecular composite material film of Comparative Example 3 produced by using the polybenzothiazol prepolymer (not copolymer) shows a lower tensile modulus as the temperature becomes higher than about 280° C. This is due to the fact that the matrix polymer is melted by heating, whereby the polybenzothiazol is coagulated. With respect to the tensile strength, it decreases in the film of Comparative Example 3 as the heat treatment temperature becomes higher than about 280° C. However, the film of Example 6 shows a high tensile strength even when the heat treatment temperature becomes higher than about 280° C.

EXAMPLE 7

(1) Synthesis of oligomer I and oligomer II

A 50-ml flask well dried in advance was charged with 5 ml of N-methyl-2-pyrrolidone (NMP) in a dried argon stream, and 3 mmol (0.835 g) of a compound A represented by the formula (11):

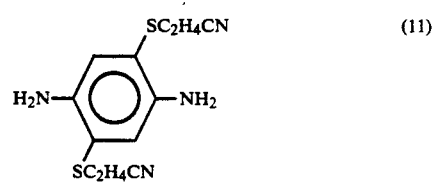

(11)

was added to prepare a homogeneous solution.

This solution was cooled in an ice water bath, and 1.85 mmol (0.439 g) of 2-chloroterephthalic acid chloride as a dicarboxylic acid derivative was added. The solution was stirred for 5 minutes to synthesize an oligomer I.

Apart from the preparation of the oligomer I, a 50-ml flask well dried in advance was charged with 10 ml of NMP in a dried argon stream, and 7 mmol (1.4014 g) of an aromatic diamino compound represented by the formula (12):

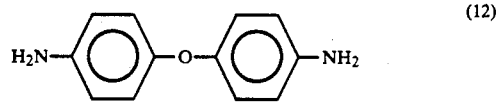

(12)

was added to prepare a homogeneous solution.

This solution was cooled in an ice water bath, and 8.15 mmol (1.936 g) of 2-chloroterephthalic acid chloride as a dicarboxylic acid derivative was added. The solution was stirred for 5 minutes to synthesize an oligomer II.

(2) Synthesis of precopolymer for aromatic heterocyclic block copolymer

The oligomer I solution in NMP was added to the oligomer II solution in NMP. After that, the flask containing the oligomer I solution was washed with 2 ml of NMP twice, and the resulting washings were also added to the oligomer II solution.

The mixed oligomer solution was cooled in an ice water bath, and heated to room temperature and kept at room temperature for 4 hours while stirring.

The resulting solution was poured into a large amount of methanol while stirring. Thereafter, filtration was conducted, and the resulting precipitate (polymer) was dried at 100° C. for 24 hours in vacuum. Its yield was 99.8%.

This polymer had an intrinsic viscosity $\eta_{inh}$ of 0.92 (dl/g) by measurement in NMP at a polymer concentration of 0.5 g/dl at 30° C. by an Ubbelode's viscometer.

It was presumed that this polymer (precopolymer) had the following formula (24):

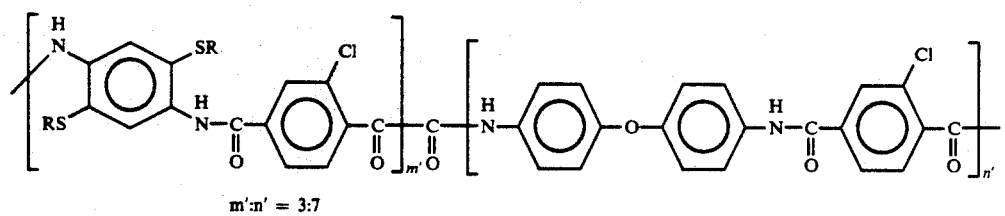

m':n' = 3:7

In this polymer, the rigid moiety derived from the oligomer I had a polymerization degree of "m'," and the soft (flexible) moiety derived from the oligomer II had a polymerization degree of "n'," satisfying the ratio (m'/n') of 3:7.

This precopolymer was dissolved in NMP, and the resulting solution was cast onto a glass plate to form a transparent isotropic film having a thickness of 30 μm. By measurement according to JIS K7127, it was confirmed that the film had a tensile modulus of 361 kgf/mm², and a tensile strength of 11.9 kgf/mm².

(3) Ring closure reaction to aromatic heterocyclic block copolymer

The film obtained in the step (2) was heated at 350° C. for 30 minutes to obtain a dark brown transparent film. According to TG-DTA and IR spectrum measurement, it was confirmed that the substituted alkyl group attached to the compound A were removed, and that thiazole rings were formed at 306° C. It was presumed that the resulting aromatic heterocyclic block copolymer had the following formula (25):

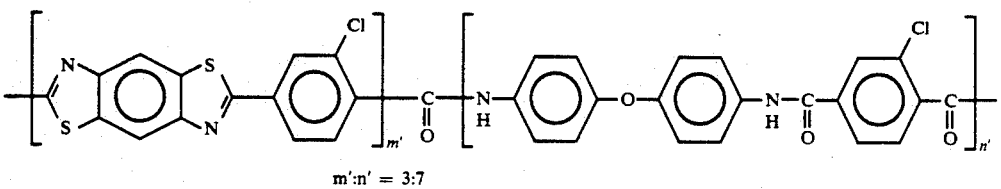

m':n' = 3:7

By measurement according to JIS K7127, it was confirmed that the resulting film had a tensile modulus of 650 kgf/mm², and a tensile strength of 18.6 kgf/mm².

EXAMPLES 8-10

Three types of precopolymers for aromatic heterocyclic block copolymers having various m'/n' ratios (m' denotes the polymerization degree of the rigid moiety derived from the oligomer I, and n' denotes the polymerization degree of the soft (flexible) moiety derived from the oligomer II) were prepared in the same manner as in Example 7 using the same compound A, aromatic diamino compound and dicarboxylic acid derivative as in Example 7 at various concentrations.

Each precopolymer was measured with respect to a yield, an intrinsic viscosity $\eta_{inh}$, a thiazole ring closure reaction temperature and properties (tensile modulus and tensile strength). With respect to each of the resulting aromatic heterocyclic block copolymers, a ratio (m'/n') of a rigid moiety to a soft (flexible) moiety and properties (tensile modulus and tensile strength) were also measured. The results are shown in Table 2. Incidentally, Table 2 also shows the results of Example 7.

EXAMPLE 11

An aromatic heterocyclic block copolymer was prepared in the same manner as in Example 7, except for using isophthalic acid chloride in place of 2-chloroterephthalic acid chloride as a dicarboxylic acid derivative and changing the concentrations of monomers.

The precopolymer was measured with respect to a yield, an intrinsic viscosity $\eta_{inh}$, a thiazole ring closure reaction temperature and properties (tensile modulus and tensile strength). With respect to the resulting aromatic heterocyclic block copolymer, a ratio (m'/n') of a rigid moiety to a soft (flexible) moiety and properties (tensile modulus and tensile strength) were also measured. The results are shown in Table 2.

TABLE 2

| Example No. | 7 | 8 | 9 | 10 | 11 |
|---|---|---|---|---|---|
| m:n[1] | 3:7 | 8:2 | 6:4 | 2:8 | 1:9 |
| Yield[2] | 99.8 | 99.8 | 99.8 | 99.8 | 99.9 |
| $\eta_{inh}$[3] | 0.92 | 0.93 | 0.86 | 0.63 | 0.65 |
| Ring Closure Reaction Temperature | | | | | |
| Point A[4] | — | 3.67 | 351 | — | 329 |
| Point B[5] | 306 | 338 | 337 | 298 | 300 |
| Properties Before Ring Closure Reaction | | | | | |
| Tensile Modulus[6] | 361 | — | — | 366 | — |
| Tensile Strength[7] | 11.9 | — | — | 8.7 | — |
| Properties After Ring Closure Reaction | | | | | |
| Tensile Modulus[6] | 650 | — | — | 699 | — |
| Tensile Strength[7] | 18.6 | — | — | 17.3 | — |

Note
[1] Ratio of the rigid moiety derived from the oligomer I to the soft (flexible) moiety derived from the oligomer II in the aromatic heterocyclic block copolymer.
[2] Unit is %. Measured on precopolymer.
[3] Intrinsic viscosity of precopolymer measured in NMP at a polymer concentration of 0.5 g/dl at 30° C. by an Ubbelode's viscometer.
[4] Unit is °C. Determined by a temperature at which the weight loss due to ring closure reaction stopped on a chart in the case of temperature elevation at 10° C./minutes in $N_2$ in TG-DTA measurement.
[5] Unit is °C. Determined by a point of inflection on a chart at the end of the weight loss due to ring closure reaction in TG-DTA measurement under the same conditions as in [4].
[6] Unit is kgf/mm².
[7] Unit is kgf/mm².

EXAMPLE 12

A plurality of precopolymer films were prepared in the same manner as in Example 7, to investigate the relations between the heat treatment temperature of a precopolymer and the tensile modulus and tensile strength of the resulting aromatic heterocyclic block copolymer. Each precopolymer film was heated at a temperature from about 225° C. to about 350° C. to produce a film of an aromatic heterocyclic block copolymer.

Figure 5:
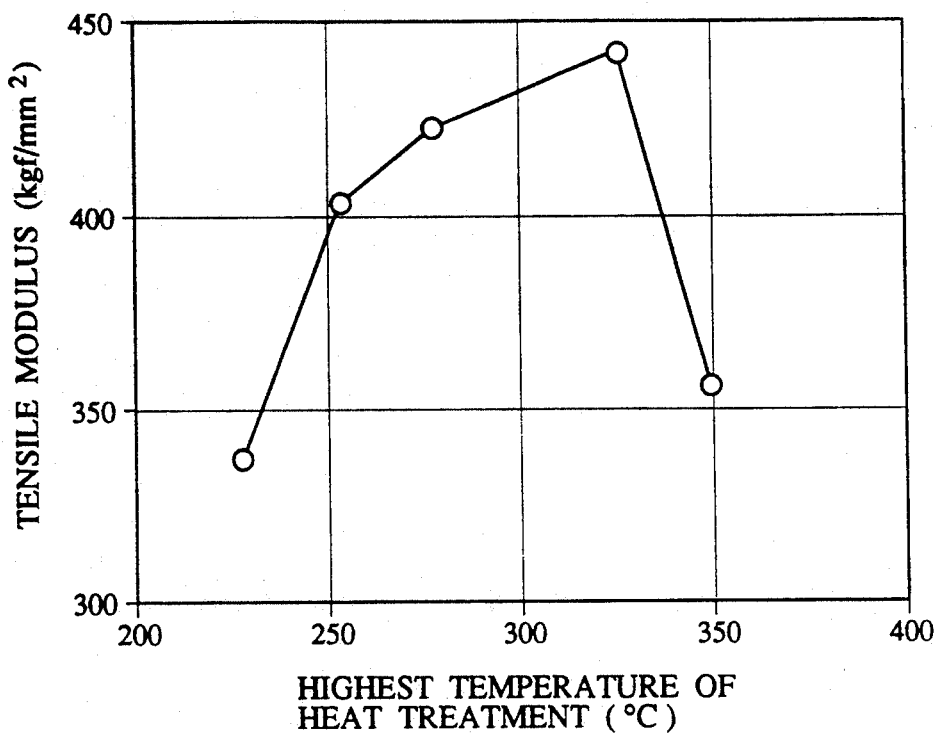
FIG. 5 is a graph showing the relation between the tensile modulus of the aromatic heterocyclic block copolymer and the highest temperature of the heat treatment in Example 12.
Figure 6:
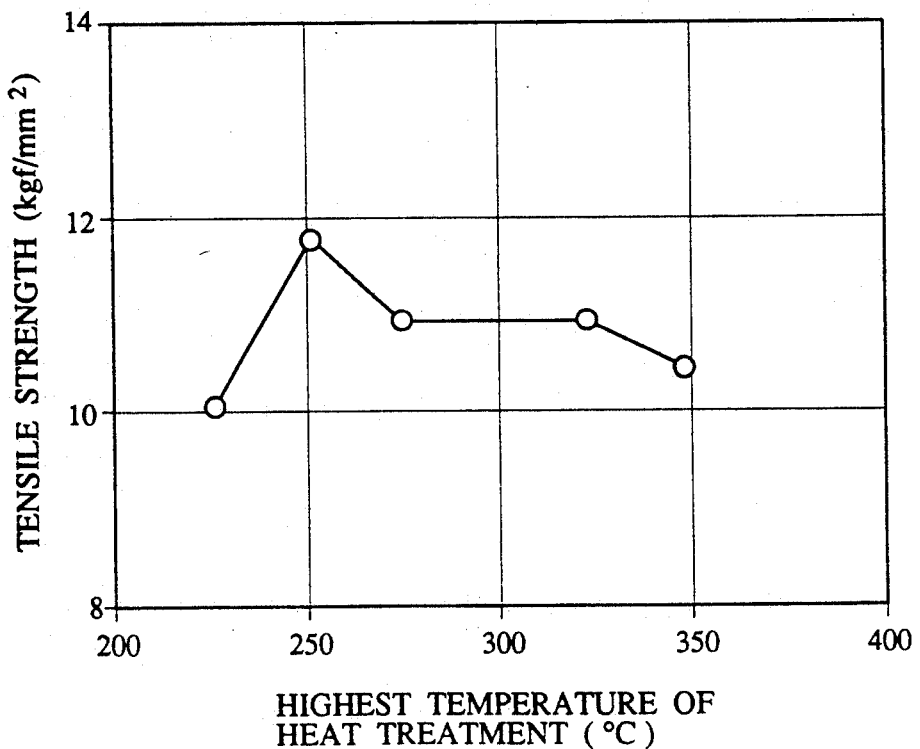
FIG. 6 is a graph showing the relation between the tensile strength of the aromatic heterocyclic block copolymer and the highest temperature of the heat treatment in Example 12.

The resulting aromatic heterocyclic block copolymer was measured with respect a tensile modulus and a tensile strength. The results are shown in FIGS. 5 and 6.

REFERENCE EXAMPLE 1

It is generally difficult to measure the polymerization degree of the rigid moiety derived from the oligomer I in the aromatic heterocyclic block copolymer. Accordingly, to investigate the polymerization degree of the rigid moiety, the molecular weight of each oligomer I obtained as an intermediate product in Examples 1 and 3 was determined from the result of intrinsic viscosity measurement.

The oligomer I in Example 1 had an intrinsic viscosity $\eta_{inh}$ of 0.36 (dl/g) (in N-methyl-2-pyrrolidone at 30° C.). Also, the oligomer I in Example 3 had an intrinsic viscosity $\eta_{inh}$ of 0.43 (dl/g) (in N-methyl-2-pyrrolidone at 30° C.).

From the above results, it is presumed that the rigid moieties of the aromatic heterocyclic block copolymers in Examples 1 and 3 are relatively short (with small polymerization degree).

EXAMPLE 13

(1) Synthesis of oligomer I and oligomer II

A 50-ml flask well dried in advance was charged with 5 ml of N-methyl-2-pyrrolidone (NMP) in a dried argon stream, and 8 mmol (2.227 g) of a compound A represented by the formula (11):

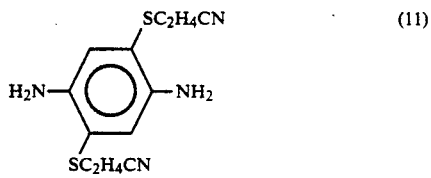

was added to prepare a homogeneous solution.

This solution was cooled in an ice water bath, and 8.2 mmol (1.947 g) of 2-chloroterephthalic acid chloride as a dicarboxylic acid derivative was added. The solution was stirred for 5 minutes to synthesize an oligomer I.

Apart from the preparation of the oligomer I, a 50-ml flask well dried in advance was charged with 10 ml of NMP in a dried argon stream, and 2 mmol (0.4004 g) of an aromatic diamino compound represented by the formula (12):

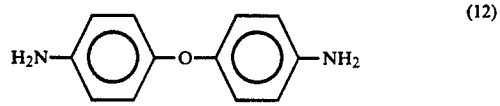

was added to prepare a homogeneous solution.

This solution was cooled in an ice water bath, and 1.8 mmol (0.427 g) of 2-chloroterephthalic acid chloride as a dicarboxylic acid derivative was added. The solution was stirred for 5 minutes to synthesize an oligomer II.

(2) Synthesis of precopolymer for aromatic heterocyclic block copolymer

The oligomer I solution in NMP was added to the oligomer II solution in NMP. After that, the flask containing the oligomer I solution was washed with 2 ml of NMP, and the resulting washings were also added to the oligomer II solution.

The mixed oligomer solution was cooled for 1 hour while stirring in an ice water bath, and then heated to room temperature and kept at room temperature for 4 hours while stirring.

The resulting solution was poured into a large amount of methanol while stirring. Thereafter, filtration was conducted, and the resulting precipitate (polymer) was dried at 100° C. for 24 hours in vacuum. Its yield was 99.8%.

This polymer had an intrinsic viscosity $\eta_{inh}$ of 0.93 (dl/g) by measurement in NMP at a polymer concentration of 0.5 g/dl at 30° C. by an Ubbelode's viscometer.

It was presumed that this polymer (precopolymer) had the following formula (26):

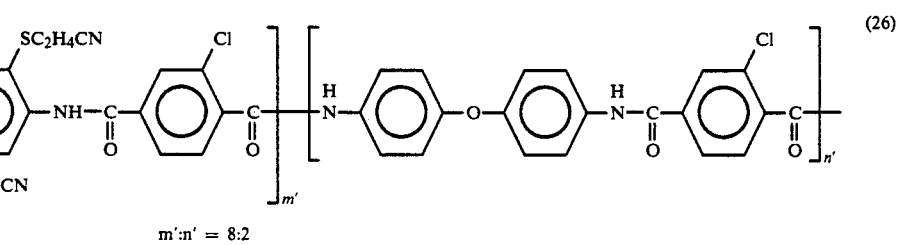

m':n' = 8:2

In this polymer, the rigid moiety derived from the oligomer I had a polymerization degree of "m'," and the soft (flexible) moiety derived from the oligomer II had a polymerization degree of "n'," satisfying the ratio (m'/n') of 8:2.

EXAMPLE 14

A precopolymer for an aromatic heterocyclic block copolymer was prepared in the same manner as in Example 13 except for setting the ratio (m'/n') at 6:4 in the formula (26):

A yield of this polymer was 99.8%. Also, this polymer had an intrinsic viscosity $\eta_{inh}$ of 0.86 (dl/g) by measurement in NMP at a polymer concentration of 0.5 g/dl at 30° C. by an Ubbelode's viscometer.

EXAMPLE 15

The precopolymer prepared in Example 13 and an aromatic polyamide (TX-1, manufactured by Toray, Ltd.) as a matrix polymer were used to prepare various molecular composite materials with percentages of rigid moieties containing thiazole rings (moieties in parenthesis of "m'" in the formula (26) after thiazole ring closure reaction) changing up to 17 weight % based on the total amount of the aromatic heterocyclic block copolymer and the matrix polymer, by the procedure described below.

First, predetermined amounts of the precopolymer and TX-1 (total amount of these two components was kept at 5 weight %) were dissolved in NMP. Mixing was conducted at 80° C. for one week. Next, the resulting homogeneous polymer solution in NMP was cast onto a glass plate and the solvent was removed at 80° C.

under normal pressure to form a transparent isotropic film having a thickness of 30 μm.

Figure 7:
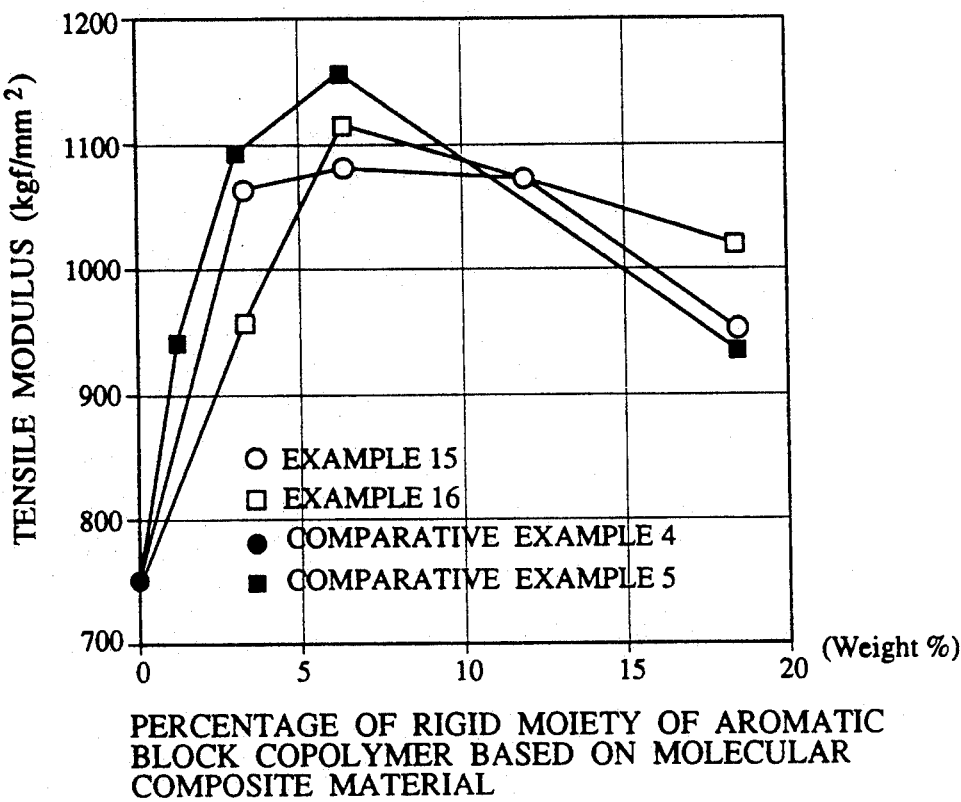
FIG. 7 is a graph showing the relation between the tensile modulus of the film made of a molecular composite material and the proportion (weight %) of a rigid moiety of the aromatic heterocyclic block copolymer based on the molecular composite material in Examples 15 and 16 and Comparative Example 4.
Figure 8:
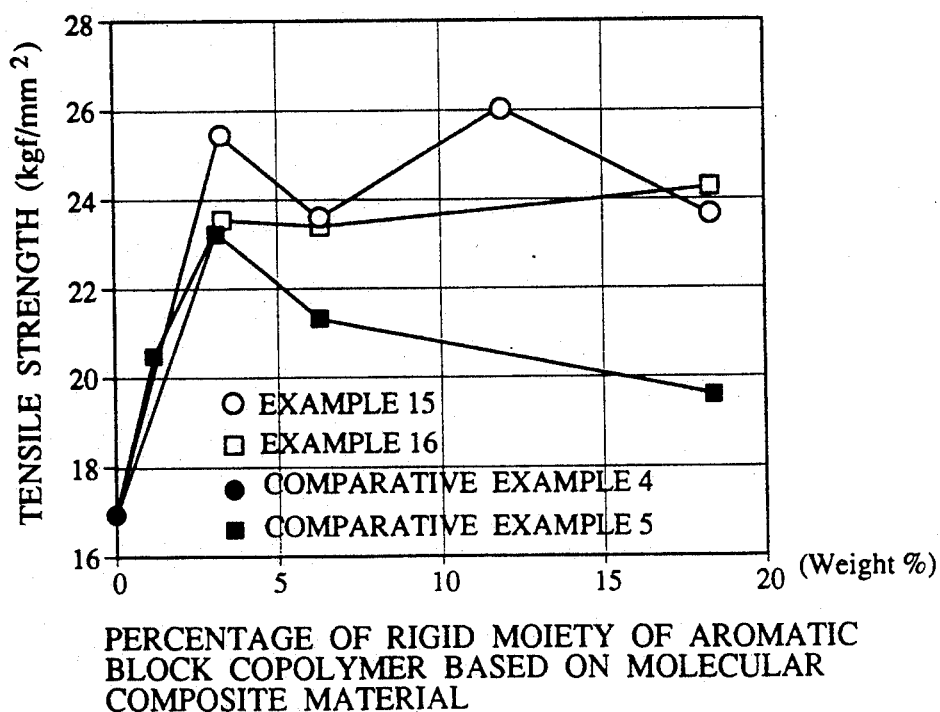
FIG. 8 is a graph showing the relation between the tensile strength of the film made of a molecular composite material and the proportion (weight %) of a rigid moiety of the aromatic heterocyclic block copolymer based on the molecular composite material in Examples 15 and 16 and Comparative Example 4.

The resulting film was heated at 340° C. for 30 minutes in vacuum. According to TG-DTA and IR spectrum measurement on the heat-treated film, it was confirmed that thiazole rings were formed. According to JIS K7127, the resulting film was measured with respect to a tensile modulus and a tensile strength. FIG. 7 shows the results of tensile modulus measurement, and FIG. 8 shows the results of tensile strength measurement. In FIGS. 7 and 8, the abscissa indicates the percentage (weight %) of rigid moieties containing thiazole rings in the aromatic heterocyclic block copolymer.

COMPARATIVE EXAMPLE 4

Only TX-1 was added to NMP without adding the precopolymer, and a film was prepared in the same manner as in Example 15. This film was measured with respect to a tensile modulus and a tensile strength. The results of tensile modulus measurement and tensile strength measurement are shown in FIGS. 7 and 8, respectively.

COMPARATIVE EXAMPLE 5

A film was produced in the same manner as in Example 15 except for using a ladder polymer obtained by a chemical reaction represented by the formula (27):

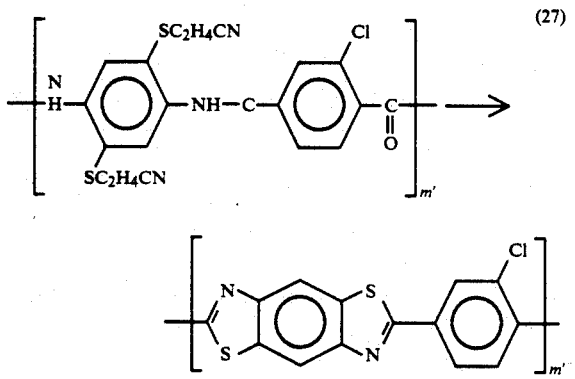

in place of the precopolymer in Example 15. The resulting film composed of the ladder polymer and TX-1 was measured with respect to a tensile modulus and a tensile strength in the same manner as in Example 15. The results of tensile modulus measurement and tensile strength measurement are shown in FIGS. 7 and 8, respectively.

As is clear from FIGS. 7 and 8, the molecular composite material of the present invention (Example 15) shows higher tensile strength than those of Comparative Examples 4 and 5.

EXAMPLE 16

A plurality of films were produced in the same manner as in Example 15 except for using the precopolymer synthesized in Example 14. With respect to each film, tensile modulus and tensile strength measurement were conducted in the same manner as in Example 15. The results of tensile modulus measurement and tensile strength measurement are shown in FIGS. 7 and 8, respectively.

As is clear from FIGS. 7 and 8, the molecular composite material of the present invention (Example 16) has a higher tensile strength than those of Comparative Examples 4 and 5 containing reinforcing polymers (not copolymerized), and with respect to the tensile modulus, they are substantially on the same level.

EXAMPLE 17

A film made of a molecular composite material was produced in the same manner as in Example 15 except for using the precopolymer synthesized in Example 13 and a matrix polymer having a skeleton shown by the formula (23):

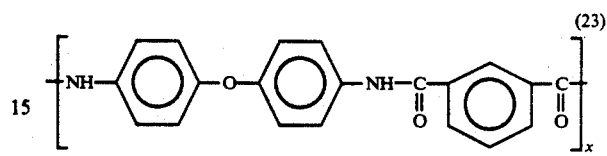

wherein x denotes a polymerization degree. Incidentally, a ratio of the precopolymer to the matrix polymer was set such that the percentage of rigid moieties containing thiazole rings was 10 weight %.

EXAMPLE 18

A film made of a molecular composite material was produced in the same manner as in Example 15 except for using the precopolymer synthesized in Example 14 and the matrix polymer used in Example 17. Incidentally, a ratio of the precopolymer to the matrix polymer was set such that the percentage of rigid moieties containing thiazole rings was 10 weight %.

The films obtained in Examples 17 and 18 were subjected to a heat treatment at a maximum temperature of 230°–330° C. The resulting molecular composite material films were measured with respect to a tensile modulus. The results of tensile modulus measurement are shown in FIG. 9.

Figure 9:
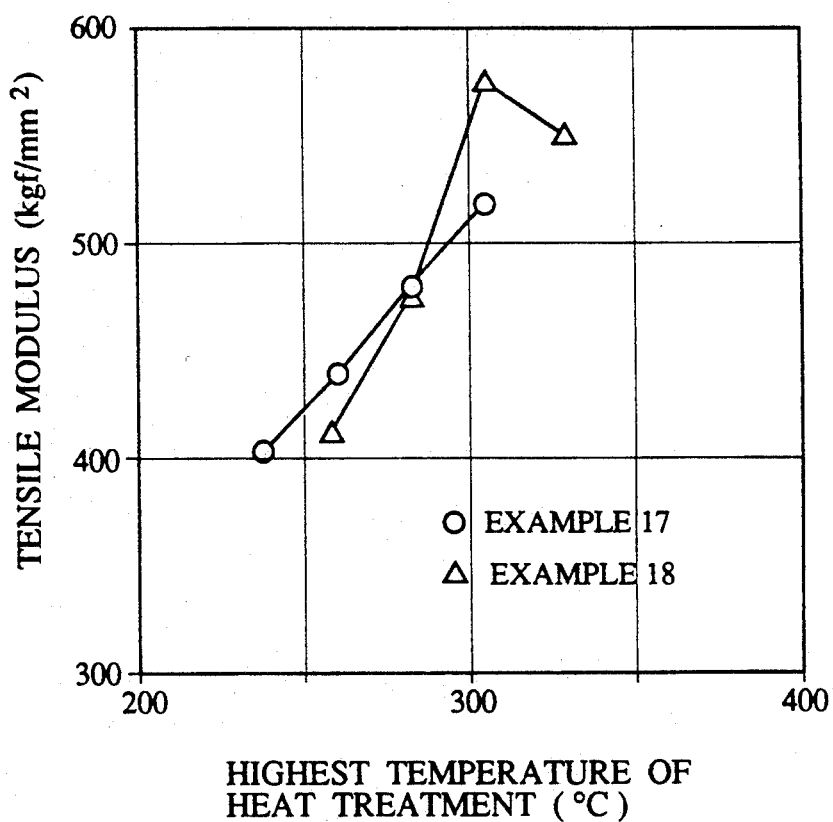
FIG. 9 is a graph showing the relation between the tensile modulus of the film made of a molecular composite material and the highest temperature of the heat treatment in Examples 17 and 18.

As is clear from FIG. 9, the molecular composite materials of the present invention show a higher tensile modulus as the heat treatment temperature of the film increases from about 250° C. to 350° C. at which the thiazole ring closure reaction is completed.

As described above in detail, by utilizing a two-step reaction method comprising preparing a precopolymer for an aromatic heterocyclic copolymer and then subjecting it to a ring closure reaction by heating, the precopolymer can easily be produced under moderate conditions (without heating to a high temperature) in an organic solvent. Since the resulting aromatic heterocyclic copolymer has a chain structure consisting of a rigid moiety and a soft (flexible) moiety, it shows not only excellent mechanical strength, heat resistance and solvent resistance but also good flexibility, elongation and moldability.

In the case of the aromatic heterocyclic block copolymer, since it is produced by synthesizing two oligomers in an organic solvent separately from a combination of the compound A and the dicarboxylic acid derivative and from a combination of the aromatic diamino compound and the dicarboxylic acid derivative, reacting these two oligomers in an organic solvent to form a precopolymer, and then subjecting it to a ring closure reaction by heating, it has alternating rigid moieties and soft (flexible) moieties each having a certain length, thereby showing not only excellent mechanical strength, heat resistance, solvent resistance, etc. but also good flexibility, elongation and moldability.

The aromatic heterocyclic copolymer according to the present invention can be used as high-strength, high-heat resistance engineering plastics alone or in combination with other polymers widely for aircrafts, automobiles, spacecrafts, etc.

Since the aromatic heterocyclic copolymer having (i) a rigid moiety having a thiazole ring, and (ii) a soft (flexible) moiety having a high compatibility with a matrix polymer is used as a reinforcing polymer in the molecular composite material of the present invention, and since the aromatic heterocyclic copolymer is blended with a matrix polymer at the stage of a precopolymer, the reinforcing polymer is well dispersed in the matrix polymer, resulting in the molecular composite material having high mechanical properties without coagulation thereof, unlike in the case of molecular composite materials containing polybenzothiazol homopolymers.

The molecular composite materials according to the present invention can also be used widely for aircrafts, automobiles, spacecrafts, etc.

What is claimed is:

1. A method for producing an aromatic heterocyclic random copolymer comprising the steps of:

(a) reacting (i) an aromatic diaminodithiol compound, the hydrogen atoms of the thiol groups of said compound being substituted with substituted or unsubstituted alkyl groups, with (ii) an aromatic diamino compound and (iii) a dicarboxylic acid derivative in an organic solvent, to produce a precopolymer having repeating units represented by the formula (1):

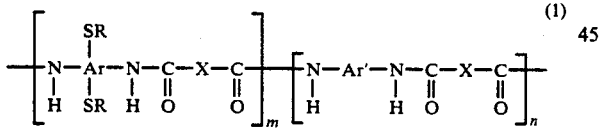

wherein Ar and Ar' are aromatic residues, R is a substituted or unsubstituted alkyl group, X is a residue of said dicarboxylic acid derivative, and m and n are integers having a ratio (m/n) of 0.01/99.99–99.99/0.01; and (b) heating said precopolymer to cause a thiazole ring closure reaction, thereby producing the aromatic heterocyclic random copolymer represented by the formula (2):

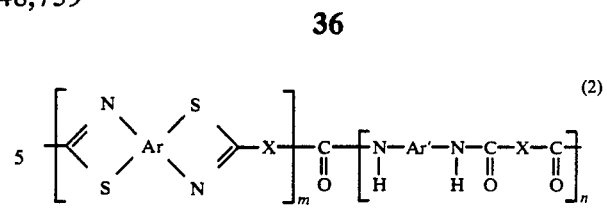

wherein Ar, Ar', X, m and n are the same as those in formula (1).

2. The method according to claim 1, wherein said aromatic residue Ar' is a diphenyl ether group.

3. The method according to claim 1, wherein said dicarboxylic acid derivative is an aromatic dicarboxylic acid derivative.

4. The method according to claim 3, wherein said aromatic dicarboxylic acid derivative is substituted or unsubstituted terephthalic or isophthalic acid dichloride.

5. A method for producing a molecular composite material comprising an aromatic heterocyclic random copolymer and a matrix polymer, comprising the steps of:

(a) preparing a homogeneous solution of (i) a precopolymer for an aromatic heterocyclic random copolymer having repeating units represented by the formula (1):
   wherein Ar and Ar' are aromatic residues, R is a substituted or unsubstituted alkyl group, X is a residue of said dicarboxylic acid derivative, and m and n are integers having a ratio (m/n) of 0.01/99.99–99.99/0.01, and (ii) a matrix polymer in an organic solvent; and (b) after removing said organic solvent, heating a blend of the precopolymer and the matrix polymer to cause a thiazole ring closure reaction, thereby providing the molecular composite material comprising the aromatic heterocyclic random copolymer represented by the formula (2):

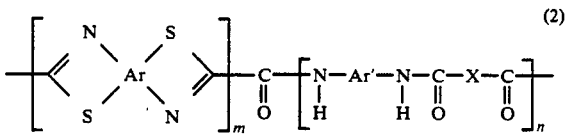

wherein Ar, Ar', X, m and n are the same as those in the formula (1), and the matrix polymer.

6. The method according to claim 5, wherein said aromatic residue Ar' is a diphenyl ether group.

7. The method according to claim 5, wherein said dicarboxylic acid derivative is an aromatic dicarboxylic acid derivative.

8. The method according to claim 7, wherein said aromatic dicarboxylic acid derivative is substituted or unsubstituted terephthalic or isophthalic acid dichloride.

9. The method according to claim 5, wherein said matrix polymer is a polyamide, a polyimide or a polyamideimide.

* * * * *